US010316985B2

(12) United States Patent
Tatarek

(10) Patent No.: US 10,316,985 B2
(45) Date of Patent: Jun. 11, 2019

(54) PRESSURE REDUCING VALVE

(71) Applicant: C2M Design OCD Limited, Hampshire (GB)

(72) Inventor: Andrew Tatarek, Hampshire (GB)

(73) Assignee: C2M Design OCD Limited (GB)

( * ) Notice: Subject to any disclaimer, the term of this patent is extended or adjusted under 35 U.S.C. 154(b) by 74 days.

(21) Appl. No.: 15/301,353

(22) PCT Filed: Mar. 31, 2015

(86) PCT No.: PCT/GB2015/051012
§ 371 (c)(1),
(2) Date: Sep. 30, 2016

(87) PCT Pub. No.: WO2015/150803
PCT Pub. Date: Oct. 8, 2015

(65) Prior Publication Data
US 2017/0114924 A1    Apr. 27, 2017

(30) Foreign Application Priority Data

Mar. 31, 2014  (GB) ................................. 1405743.4
Jun. 10, 2014  (GB) ................................. 1410327.9

(51) Int. Cl.
*F16K 15/18* (2006.01)
*F16K 31/42* (2006.01)
*G05D 16/10* (2006.01)
(52) U.S. Cl.
CPC .............. *F16K 31/42* (2013.01); *F16K 15/18* (2013.01); *G05D 16/10* (2013.01); *G05D 16/103* (2013.01)
(58) Field of Classification Search
CPC ......... F16K 31/42; F16K 15/18; G05D 16/10; G05D 16/103
See application file for complete search history.

(56) References Cited

U.S. PATENT DOCUMENTS 3,211,175 A      10/1965  Replogle
5,657,787 A  *   8/1997  Diehl ..................... G05D 16/10
                                                    137/116.5
(Continued)

FOREIGN PATENT DOCUMENTS

CA    2178573 A1    12/1996
EP    0459966 A2    12/1991
WO    9744093       11/1997

OTHER PUBLICATIONS

International Search Report of PCT/GB2015/051012, dated Sep. 21, 2015.

(Continued)

*Primary Examiner* — P. Macade Nichols
(74) *Attorney, Agent, or Firm* — Sandberg Phoenix & von Gontard P.C.

(57) ABSTRACT

A piston regulator of a type that seals on the low-pressure side of a valve seat (10) includes a mechanism by which the valve can be shut off, for example for transport or storage, without risk of overloading the seat (10). Two exemplary mechanisms are disclosed. The first involves applying a closing load to a regulating piston (6) via a closing piston (17) with a surface that is acted on by secondary pressure to press it away from the regulating piston (6). The second arrangement is based on a nested regulating element: an inner sealing element (901) and outer slidable casing (900) are separable when a closing force is applied. This allows the casing (900) to transfer forces arising from secondary pressure and excessive closing force; the sealing element (901) is pressed onto the seat through a load supplied by a closing spring (903). In both cases, the load on the seat is limited. The nested regulating element can additionally be loaded by an adjustment spring or similar to provide a variable-pressure regulated output.

14 Claims, 11 Drawing Sheets

(56) References Cited

U.S. PATENT DOCUMENTS 6,273,130 B1 8/2001 Cossins
2013/0276919 A1 10/2013 Petroci et al.

OTHER PUBLICATIONS

Written Opinion of PCT/GB2015/051012, dated Sep. 2015.
Intellectual Property Office Search Report for Application No. GB 1410327.9, dated Jan. 12, 2015.

* cited by examiner

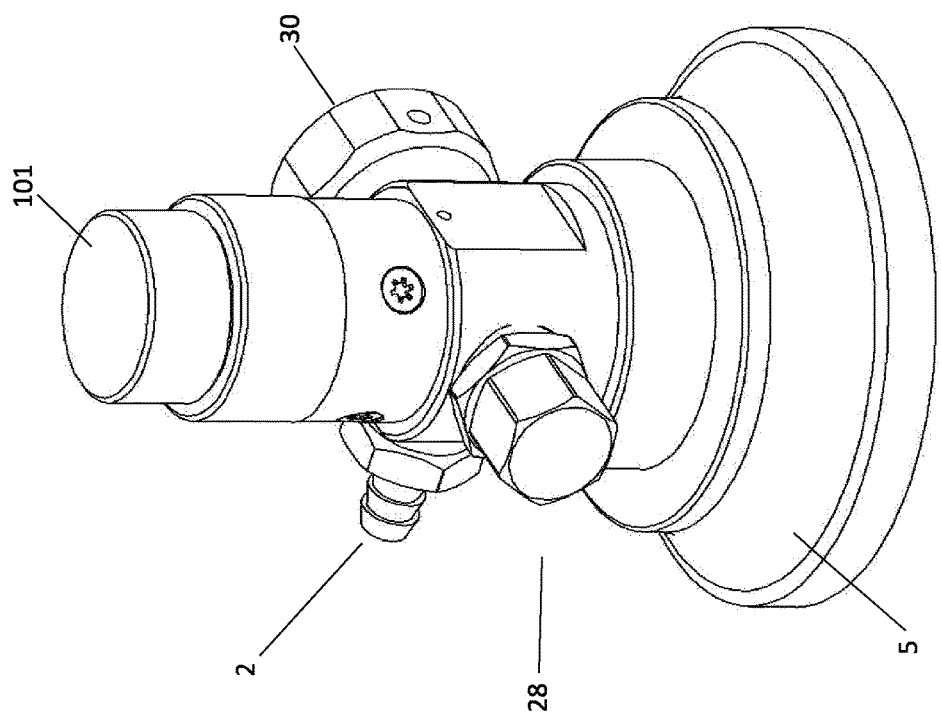
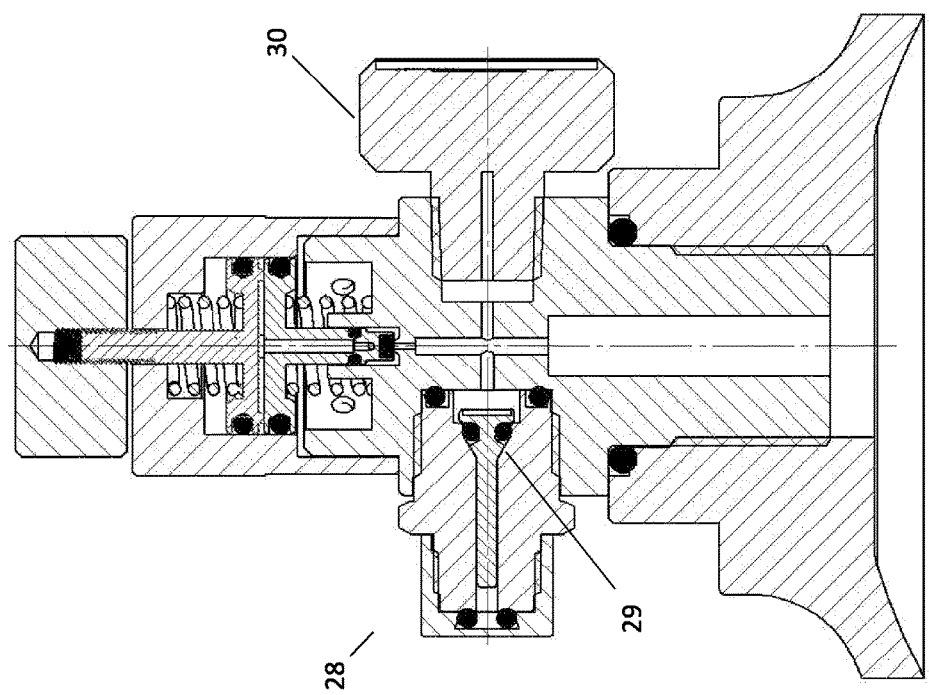
Fig 1c
Fig 1d

PRESSURE REDUCING VALVE

CROSS-REFERENCE TO RELATED APPLICATIONS

This application is a National Stage of International Application No. PCT/GB2015/051012, filed Mar. 31, 2015, which claims priority to GB 1405743.4 filed 31 Mar. 2014 and GB 1410327.9 filed 10 Jun. 2014, the disclosures of which are incorporated herein by reference.

BACKGROUND

This invention relates to the field of pressure regulators that convert high-pressure gas in a cylinder to a substantially constant, lower output pressure or to a substantially constant output flow. In particular, this invention relates to piston regulators of the type that are arranged to seal on the low-pressure side of a valve seat.

Integrated regulators are mounted on high pressure cylinders and convert the 0-300+ bar pressure in the cylinder to a substantially constant lower pressure at the output. Depending on the application, the lower-pressure output may be delivered directly to a device using regulated pressure or it may be fed through a restriction to give a substantially constant flow, as used, for example in escape equipment or in medical oxygen therapy equipment.

A typical piston regulator includes a seal on a piston that is movable towards and away from a valve seat. When the seal is in contact with the seat, fluid flow from a pressurised source, such as a cylinder, to the outlet is prevented. If the valve is open on the other hand, fluid will flow at a rate determined by the degree of opening of the valve. The piston may be arranged to seal on the input (high pressure) or output (low pressure) side of the valve.

In many ways, the design of a piston regulator that seals on the low-pressure side is more straightforward. Essentially, such a regulator relies on a spring, or similar loading mechanism, to bias the piston in an open position relative to the seat. When the regulator is in use, the bias force provided by the spring is countered by a secondary pressure that pushes the piston towards the seat and that acts over a relatively large surface area. When the seat is sealed, the secondary pressure must supply sufficient force to seal the seat against primary pressure from the cylinder plus an additional force that overcomes the bias of the spring. If fluid is then withdrawn from the outlet for use, the secondary pressure falls, it becomes insufficient to seal the seat and the valve is opened to a degree that, ideally, matches the demand. The valve will remain open, allowing fluid to replenish from the cylinder at a rate to balance its removal, until fluid is no longer required. At this point the secondary pressure rises, until it again overcomes the bias of the spring and provides sufficient force to seal the seat.

Regulators that seal on the high-pressure side are generally of a more complex design, with more forces to balance. Their advantage is that the design tends to be more adaptable and, in particular, can be made such that the secondary pressure delivered to the output can be adjusted, according to requirements. As noted, the seal on this type of regulator is on the input (high pressure) side of the valve seat. Typically, also on the high-pressure side, is a sealing spring, which presses the seal into sealing contact with the seat. In order to open the valve, a diaphragm or piston, with significantly larger (typically over ten times) diameter than the seat, is located on the low pressure side and is pushed by a regulating spring onto a pin or shaft that extends through the seat to connect with the seal. The diaphragm or piston seals a chamber from which fluid at secondary pressure can be drawn through an output. Without any secondary pressure, the force from the regulating spring tending to open the valve will exceed the combined forces arising from the sealing spring and internal fluid pressure that act to close the valve. The pin or shaft will therefore be pushed further through the valve seat, opening the valve and allowing fluid to flow from the high-pressure side. Secondary pressure will then build up in the chamber sealed by the diaphragm (or piston). This pressure acts over the area of the diaphragm to move the diaphragm away from the shaft, which in turn is pushed upwards by the sealing spring and input pressure to seal the seat. If fluid is removed through the output on the low-pressure side, the secondary pressure falls, the force from the regulating spring pushes the diaphragm back onto the shaft, which in turn lifts the seal from the seat, ideally to a degree that matches the demand. Fluid flows through the valve until secondary pressure is built up to the level required to overcome the force of the regulating spring.

In order to vary the output pressure, and so to provide a variable-output regulator, the compression of the regulating spring is adjusted. The level to which secondary pressure is allowed to build up before the seal is re-seated is controlled primarily by the imbalance between the opposing force arising from the regulating and sealing springs and by the area of piston or diaphragm over which the secondary pressure acts. Of these factors, the most readily adjustable is the regulating spring force, as this spring is accessible on the low-pressure side of the regulator. Generally a handwheel with actuation means, most frequently a thread, is used to vary regulating spring compression. This accordingly controls the level of secondary pressure at the output.

It is not straightforward to construct a variable-output regulator that seals on the valve low-pressure side. The regulating spring is generally contained within the inner workings of the valve, making it far more difficult to access to adjust compression. This is to be contrasted with the above-described high-pressure-side arrangement in which the regulating spring is positioned above the piston or diaphragm that seals the secondary pressure chamber. It is possible to load the regulating piston on the low-pressure-side version with a spring that acts from outside the secondary pressure chamber. This however brings its own complications. These complications are identical to those that arise when implementing a particular method of shutting off the regulator valve, which will be explained below.

When a regulated cylinder is not being used, or, in particular, when it is in storage or in transport, it is of course highly desirable to be able to close the valve to prevent unintended operation. It is a serious disadvantage with a piston-type regulator that seals on the low pressure side that there is no satisfactory way in which effect such a closure.

The previously-described regulators that seal on the high-pressure side can be turned off simply by removing the regulating spring load. The sealing spring and input cylinder pressure then drive the seal against the seat, closing the valve. When pressure is turned off in this way, the regulated cylinder can be safely stored or transported.

In the alternative regulator structure, in which the seal is on the low-pressure side, it is impossible to adopt this approach. One option, which similarly exploits the fact that the high-pressure valve in the regulator may also be used to turn the gas pressure off, is to use a loading mechanism such as a screw or spring to load the piston such that it can be pressed on to the seat and directly seal the regulator. In this way, the piston acts with the seat to fulfil a dual purpose as both a regulator seal and an on/off valve. An example of the type of mechanism is disclosed in EP0459966—"Arrangement in gas regulator".

There is however a fundamental problem with this approach.

The force required to compress the spring for regulator function is typically large compared to the force to seal the reducer seat. For example, on one regulator design, the spring might exert 300N, while the force on the seat required to effect a seal is about 30N.

The force that must be applied to the top of the piston, by means of the secondary pressure, is therefore quite significant. In this example, it needs to be 330N: 300N to overcome the spring plus 30N to provide sealing force.

Consider now, a piston-type regulator in which, as described above, a separate loading mechanism is included to close the valve for storage. In the event that the regulator needs to be switched off, the loading mechanism is activated to push the piston down to directly seal the seat. The closing mechanism must be able to close the valve independently of any regulating function that is being performed at the time. That is, it must seal the valve regardless of the level of secondary pressure that is already acting on the piston. If secondary pressure is minimal, with the valve fully open, then the closing force required to close the example considered here is, as before, 330N.

At the point that the force is applied to the piston to close the seat, the regulator may be open or closed and there may or may not be any secondary pressure in the low pressure area of the reducer.

If there is full secondary pressure in the low pressure area of the reducer and the seat is already in contact with the seal, the valve will already be closed. The closing mechanism is engineered to provide 330N, to guard against the scenario with minimal secondary pressure. If this pressure is then applied to the top of the piston, the load on the seal will be the existing sealing load of 30N (from the secondary pressure) plus 330N (from the closing mechanism). That is, 360N, or 12 times the force needed to effect a seal, will be applied to the materials of the seat and seal. This level of force is so far in excess of the usage force that it can easily result in damage to the seal. In consequence, the high-pressure regulator valve will no longer seal at the original 30N sealing force, harming the performance of the regulator and usually causing leakage at the original 30N force.

In its simplest form, this approach to switching off a regulator uses a screw that acts directly on the piston to seal the seat. It is almost impossible to judge what fraction of the 330N available needs to be applied to ensure that the regulator seat is closed, making it extremely likely that damage will occur. Attempts have been made to use springs to push the piston to take up tolerances and apply a more controlled load, but the fundamental problem of an excessive load on the seat whenever secondary pressure is present persists.

A similar problem is encountered in designing a variable-output version of the piston-type regulator. It is possible to load the regulating piston with a spring, which reduces the secondary pressure needed to reseal the valve. The force applied by the spring however must be effective regardless of the presence or absence of secondary pressure. If secondary pressure is present when spring load is applied, the seat will be overloaded and so liable to damage.

It would however be advantageous to be able to construct a variable-output regulator that seals on the low-pressure side. In considering the forces acting on the valve as it performs its regulator function, both low-pressure and high-pressure arrangements include a contribution from the high pressure gas inside the cylinder acting over the area of the seat. In the low-pressure construction, this force acts to open the valve; in the high-pressure construction, it acts to seal it. In both cases however, the size of its contribution is dependent on the pressure of gas in the cylinder. This is a variable factor that falls as the cylinder empties. It follows therefore that the accuracy with which regulator output pressure can be maintained over the full range of cylinder output pressures is crucially affected by such variation. For high-pressure regulators in which it is very desirable that the output pressure is maintained from a full to an empty cylinder, the high pressure gas acting on the seat determines the accuracy. The seat has to be large enough to pass the flow specified for the regulator at the lowest cylinder pressure. The high pressure on the seat area is most often the main variable. For optimum regulator accuracy therefore it is desirable to minimise the relative size of this force and one way to achieve this is to minimise the area of the seat.

By sealing the seat on the high-pressure side if the valve, it is not only necessary to have the seat large enough to pass the flow specified but also to allow a pin to extend through it to push down the seal. The pin forces the seat to be larger to compensate for the cross-sectional area it takes up. This means that the sealing area for the high pressure seat is larger than it has to be purely to pass the flow. The low-pressure construction has no need of the pin and so the seat—seal effective area is smaller. This reduces the effect of its variable contribution to regulator output pressure. For the same flow capacity therefore, it is possible to design a more accurate regulator that seals on the low-pressure side of the valve. The problem, of course, is that this is not straightforward to design and that the prior art has no satisfactory way in which to close it. For this reason, the design of regulator that seals on the high-pressure side is used when variable output is required, despite its reduced accuracy.

The diaphragm or piston can be made larger to mask the variations arising through seat area, but this makes the regulator bigger and more expensive, requiring a larger regulating spring.

A further advantage of sealing on the low-pressure side is that, if the seat leaks, the build up in secondary pressure increases the sealing load on the seat and therefore helps to seal the seat, preventing further escape of gas. By way of contrast, if the seat that is sealed on the high-pressure side leaks, the increase in output pressure does not result in an increase in sealing load on the seat.

It is, of course, possible to turn off a regulator that seals on the low-pressure side by some other mechanism that bypasses the requirement to push the piston seal down onto the seat. Two principal alternatives are known, but these possess their own disadvantages.

In one arrangement, a high pressure on/off valve is provided between the regulator and the cylinder. The high pressure valve isolates the cylinder supply from the regulator. This type of valve is very common: an example is disclosed in CA2178573—"valve and pressure regulator assembly for gas cylinder and gas cylinder comprising same".

This arrangement suffers from a number of disadvantages. First, it requires a moving high pressure seal on the mechanism (usually a valve stem) to operate the on/off valve. Secondly, adiabatic heating occurs downstream of the on/off valve on opening. That is, the volume between valve and regulator is heated as a result of gas compression. The heating can be significant, and this volume can therefore be subjected to very high temperatures, which can potentially ignite the valve. Another risk of ignition arises again during opening, but this time as a result of rapid closure of the regulator valve as high-pressure gas first flows into the system and causes the secondary pressure to increase quickly. This closure results in rapid movement of the piston, causing the seat to impact the seal. Finally, providing a separate high-pressure valve represents a duplication of parts. The reducer already has a high-pressure seal and an on/off valve merely duplicates this functionality.

Alternatively, a low pressure valve may be provided downstream of the regulator. This enables the switching on and off to be effected at low pressure, which is technically far easier to achieve than switching at high pressure. In particular, material considerations are less restrictive. A valve that is closed using this arrangement is described in U.S. Pat. No. 6,273,130—"Gas regulator/valve device".

This alternative arrangement though means that the number of seals that are pressurised, even when the valve is closed, is high. A leak in any one of these can cause the cylinder to drain during transport and storage. On the other hand, the adiabatic heating effect is eliminated The attendant difficulties of a high pressure on/off valve are eliminated or substantially reduced, as there is no immediate full opening of the high pressure seal.

The disadvantages of both these arrangements are avoided by direct sealing of the regulator seat by a seal on the piston.

There is therefore a perceived need for an alternative design of regulator that permits the potential advantages of a valve that is sealed on its low-pressure side to be realised, without running the risk of overloading and damaging the seat.

It is an object of this invention to provide a novel design of regulator that can be safely turned off, if required; that offers the potential for regulation with an adjustable output pressure, which can be maintained with improved accuracy in comparison with the prior art and that also includes a mechanism to protect the valve seat from overload.

The present invention relates to a novel design of regulator that is based on a regulator of the type that seals on the low-pressure side of the valve, but that can be turned off or adjusted to provide a variable output pressure without risk of overloading the valve seat.

The present invention provides a pressure reducing valve comprising:

a housing including a valve passage connected to a primary port and a secondary port;

a valve element provided in the housing, configured to adjust an opening degree of the valve passage by moving between a closed position in which a sealing part of the valve element is in contact with a valve seat and therefore closes the valve passage and an open position in which the valve element opens the valve passage, and configured to be pressed by secondary pressure toward the closed position;

a regulator biasing member configured to bias the valve element toward the open position against the secondary pressure;

an actuating mechanism that is operable to apply a shut-off force to the valve element to move it towards the closed position; wherein the valve element is arranged such that, when the actuating mechanism is operated, a sealing force that arises between its sealing part and the valve seat is less than a total force arising through secondary pressure acting on the valve element and the shut-off force.

This invention is based on the realisation that it is possible to prevent or to negate the effect of secondary pressure as the valve is closed. The presence or absence of secondary pressure is a source of great uncertainty in determining the force necessary to close off the valve at its high pressure seat. By taking its effect out of the equation of forces acting to seal the valve, the valve can be turned off, without risk of overloading the seat.

In one implementation of this invention, the force applied to close off the valve is mediated by secondary pressure. This effectively cancels its contribution to the force on the seat. Specifically, in this embodiment, the present invention relates to a means of turning off the output pressure of a regulator, by applying load to a regulating valve element, such as a piston, using a closing piston, or similar, with a surface that is acted on by the secondary pressure to press it away from the regulating piston. The closing piston is movable between a first position in which it holds the regulating piston in its closed position and a second position in which the closing piston is moved away from the regulating piston, allowing the regulating piston freedom to move as it provides its normal regulator function.

When activating the loading mechanism to switch off the regulator, the high load required to overcome the regulator spring and to seal the seat is applied to the closing piston, which therefore moves towards the regulating piston. As in the prior art, there may or may not be any secondary pressure in this low pressure area when the regulator is switched off.

If there is secondary pressure in the low pressure area of the piston, this pressure acts equally on both the regulating piston and the closing piston to which the closing load is applied. The secondary pressure acting on the closing piston opposes the high closing load that is necessarily applied to switch off the regulator. The result is that the net force communicated from the closing piston to the regulating piston is reduced by the amount arising from the secondary pressure. If the secondary pressure is high, then this force will be small. The resultant force on the seal is therefore only slightly more than without the closing piston, which of course is only slightly more than that which is sufficient to effect the seal.

If there is no secondary pressure, the regulator valve is fully open and transmission of the full closing load through the closing piston to the regulating piston is necessary and occurs. The regulator spring takes up much of the force, and again only slightly more than sealing pressure is applied to the valve seat via the regulating piston.

This means that the presence or absence of secondary pressure in the regulator has almost no effect on the load being applied between seal and seat. The load on the high pressure seal is the same whether there is pressure in the low pressure area or not.

The present invention is not restricted by the mechanism employed to move the closing piston between the first position and the second position. Any conventional means may be used to effect the movement, such as a threaded hand-wheel, a lever that is movable between two positions, a toggle action mechanism, a cam, or any other mechanism.

The present invention may include a passage through the closing piston, with a moving seal of small area compared to the main diameter of the closing piston, to transmit fluid from a low pressure area, through the closing piston to a volume beyond it. The low pressure fluid, once in this volume, can be used for any function to which the output of a regulator is put. For example, metered through a metering orifice for delivery to a patient, or passed through a second reducer, which may be a precision reducer or a variable reducer to deliver a variable pressure, or any other function for which the output of a cylinder may normally be used.

The present invention may use the closing piston to relieve secondary pressure that is too high, for example such as may arise through a failure of the regulator seat. This can be achieved by locating vents in the bore above the normal retracted position of the closing piston, wherein increasing secondary pressure forces the closing piston upwards to expose the vents, allowing excess pressure to be relieved. Relative positioning can be arranged such that if the secondary pressure exceeds the normal operating pressure by a pre-set level, the vents to relieve the excess pressure are exposed.

In its second implementation, the present invention effectively splits the regulating piston into two parts. One part bears the secondary pressure load and any excess applied to close the valve; the other part, which includes the seal, is subject only to a load sufficient to effect the seal without damaging the seat.

The present invention therefore also includes a pressure reducing valve in which the valve element comprises a sealing element that incorporates the sealing part, a supporting element and a closing biasing member, the sealing element being slidable relative to the supporting element and biased by the closing biasing member against an upper surface of the supporting element and towards the seat such that:

in the absence of the shut-off force, the sealing and supporting element are moveable as a single unit under the influence of regulator biasing member and secondary pressure; and in the event of operation of the actuation mechanism beyond a threshold level, the sealing element becomes moveable relative to the supporting element such that the influence of the shut-off force and secondary pressure is predominantly experienced by the supporting element, leaving the sealing element pressed onto the seat predominantly under the influence of the closing biasing member.

In this way, the sealing part of the valve element is limited in the force with which is pushed against the seat by the load applied from the closing biasing member. This can be set so as to avoid damage to the seat. The unpredictable effect of secondary pressure is now directed through the supporting element, which is kept away from the valve seat.

In both implementations, the present invention allows closing of the regulating piston, without applying more than the intended load to the seat.

The present invention does not require a sliding high pressure seal between the high pressure area and the closing means.

The present invention avoids the need for a separate high pressure valve, as it makes use of the existing high pressure valve at the regulator seat. This makes it attractive as a solution for higher pressures, where avoiding sliding high pressure seals is an advantage.

As the sealing is at the regulator seat, it avoids the need for low pressure seals that would be pressurised during storage, solving the leakage problems associated with the second seal.

In its second implementation, the present invention allows output pressure to be adjusted by means of a variable load applied to the valve element in a direction counter to the influence of the regulator biasing member, the adjustable load being within a range of 0, through a level to balance the regulator biasing member to beyond the threshold level. Again, by separating the sealing part from the part of the valve element that is subject to regulating and closing forces, a variable output can be achieved in a valve that seals on its low pressure side. This therefore avoids the requirement of prior art variable-output regulators to have a shaft or pin extend through the valve seat. This means that the entire area of the valve seat is available for fluid flow, which allows the seat area to be smaller than known in the prior art, reducing the variable contribution to output pressure that arises from input pressure falling as the cylinder empties.

In another aspect, the present invention provides a regulating valve incorporating a primary valve seat and a stem attached to a valve element which is movable towards and away from the primary valve seat. The stem includes first and second conical portions, the second conical portion being of larger diameter and located a distance further from the primary valve seat. The primary valve seat includes a hole that is sealable by the first conical portion of the stem. The regulating valve also includes a passage extending from the primary valve seat to an opening in a chamber that contains the valve element, the passage being shorter than the distance between the conical portions of the valve stem, the first conical portion being located in this passage. The opening forms a secondary seat that is sealable by the second conical portion of the stem in the event of loss of the primary valve seat.

This aspect provides a new safety mechanism for a regulator valve. Without this design of valve stem, failure of the primary valve seat would result in loss of the seal and the full cylinder pressure would be communicated to the output, with possible catastrophic consequences. With this feature however, failure of the primary seat would result in the stem moving further into the passage and the larger conical portion would move to seal the secondary seat. This prevents full uncontrolled cylinder pressure being communicated to the output and allows the regulator to retain at least some regulating function. As failure of the primary seat is not an impossible event, for example if the cylinder contains oxygen, the valve may on occasion ignite and burn, this new feature represents an important development in the safety of regulators.

In order that the present invention may be well understood, embodiments thereof, which are given by way of example only, will now be described with reference to the accompanying drawings.

DESCRIPTION OF THE DRAWINGS

FIG. 1c shows a different section of the device of FIGS. 1a and 1b, showing a possible arrangement of a gauge and filling connection that could be used with the present invention.

FIG. 1d is an isometric view of the device of FIGS. 1a to 1c.

DETAILED DESCRIPTION

The basis behind the present invention is the development of a mechanism by which the seat of a regulator that is sealed on its low-pressure side is protected from overload by insulating the closing valve from the influence of secondary pressure. Two different embodiments of such a mechanism are disclosed: that set out in FIGS. 1 to 8 and that of FIGS. 9 and 10. In application, FIGS. 1 to 9 describe a regulator valve with safer shut-off means, whereas FIG. 10 describes a regulator valve with variable output pressure.

Figure 1B:
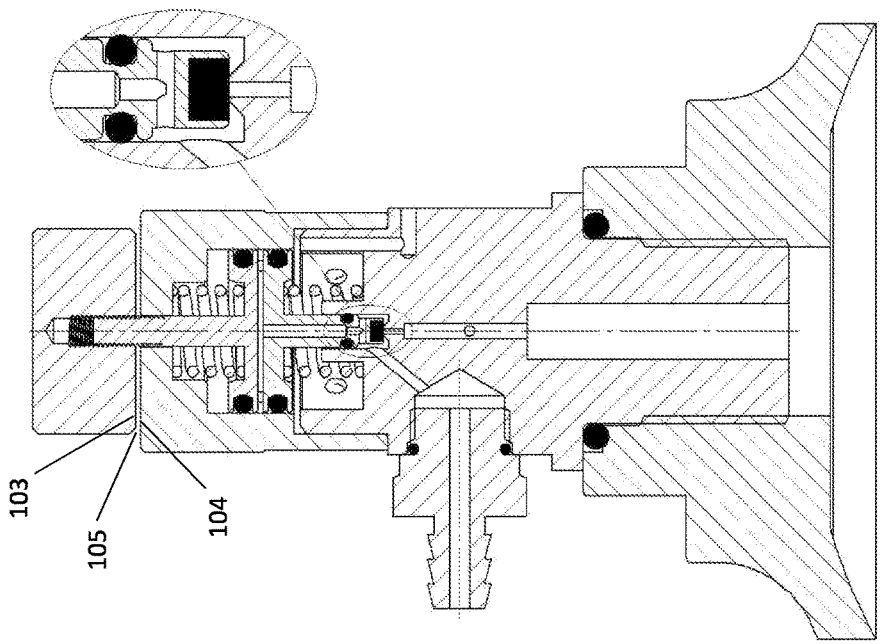
FIG. 1b shows the device of FIG. 1a in a closed position.
Figure 1A:
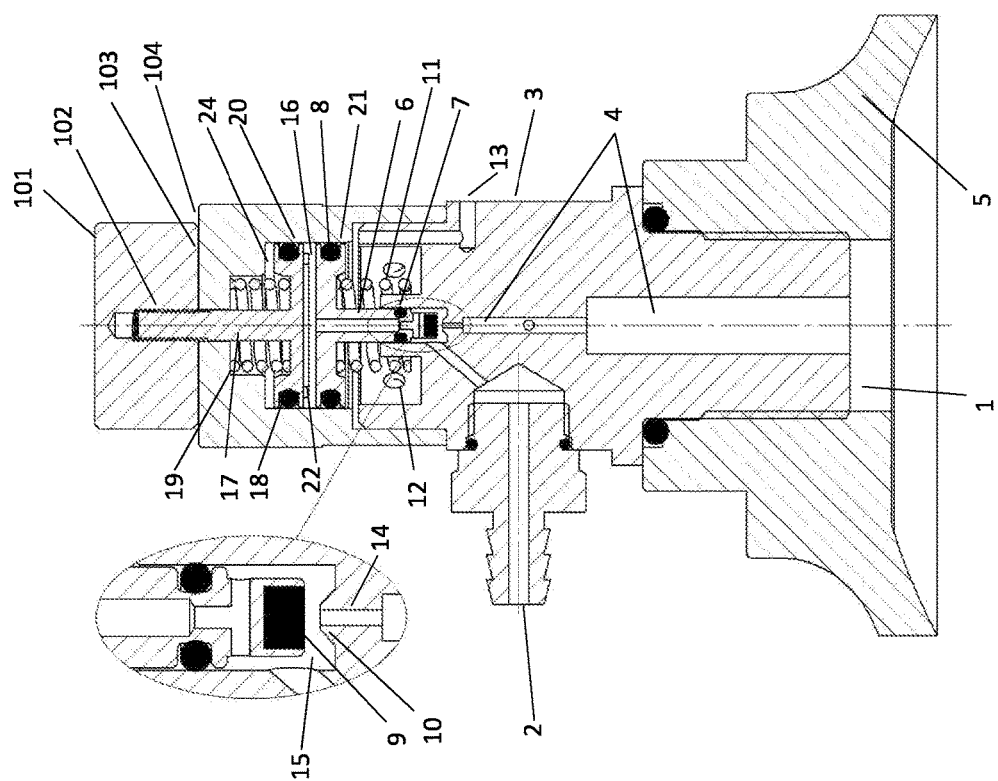
FIG. 1a shows a first embodiment with a closing piston whose movement is controlled by a threaded hand-wheel, shown in an open position.

FIG. 1a shows an embodiment of the present invention, with a regulator housing 3 including a passage 4 connected to a primary input port 1 and a secondary output port 2.

The primary port 1 is connected to a source of high pressure gas, the one shown in FIGS. 1a and 1b is a high pressure cylinder 5 (just the top of the cylinder being visible in the figure). The connection may be direct, as shown. Alternatively, the regulator housing 3 may be connected to the outlet of a conventional cylinder valve or to any other high-pressure source that needs to be regulated.

A valve element 6, in this case a piston (regulating piston), has small 7 and large 8 sliding seals is provided in the housing 3. The regulating piston 6 is configured to adjust an opening degree of the valve passage as it moves between a closed position and an open position. The closed position in which a seal 9 in the regulating piston 6 acts on a seat 10 to close the valve passage is shown in FIG. 1b. The open position in which the reducer piston opens the valve passage, by moving the seal 9 out of contact with the seat 10 is shown in FIG. 1a. The degree of opening is controlled by the distance between the seal 9 and seat 10.

One or both of the sliding seals, 7 & 8, could be replaced by diaphragms.

When the valve is open (FIG. 1a), gas from the cylinder flows through a passage in the piston 6 to a chamber 16 above. This creates a source of secondary pressure that acts on an upper surface of the piston 6 to drive it back towards the closed position.

A regulator biasing member, a spring 11 in this embodiment, is configured to bias the piston 6 toward the open position, acting against the secondary pressure. The biasing member is located in a chamber 12 with a vent 13, which maintains ambient pressure within.

In use, the regulator will provide a low-pressure flow drawn from the output port 2 (or from any volume in which the secondary pressure is present) that is replenished by high-pressure gas flowing through the valve passage 4. The maximum high-pressure flow rate through the passage is governed by a restriction 14. Provided therefore that the low-pressure output flow is not greater than that which can by supplied by the high pressure flowing through the restriction 14, the secondary pressure at the output 2, in the area just downstream of a valve output passage 15 is substantially equal to that in the chamber 16 above the valve element 6.

As demand for flow at the outlet 2 increases, the secondary pressure falls, and the biasing member 11 moves the piston 6 to a more open position, until the forces acting on the piston 6 are again balanced. Contributory forces arise from:

high pressure gas acting on the seal 9 over the surface area of the seat 10;
secondary pressure under the small piston seal 7 acting to push the piston 6 away from the closing position;
secondary pressure in the chamber 16 acting on the area of the large piston seal 8 and pushing the piston towards the closing position; and
the force from the biasing member 11.

The arrangement described thus far delivers a substantially constant output pressure at the output port from a full to nearly empty cylinder and over a range of flows. It is well known and used in many applications, providing a reliable and low cost means of regulating pressure.

The novel part of this embodiment of the invention will now be described.

The arrangement shown in FIG. 1 additionally includes a closing element 17 and a closing biasing member 19. The closing element 17 in this embodiment is a closing piston with a sliding seal 18 in a bore 20, which is a continuation of the bore 21 in which the large piston seal 8 of the valve member 6 slides. The closing biasing member 19 is a spring, which is biased to push the closing piston 17 towards the regulating piston 6. The bore 20 for the sliding seal 18 of the closing piston 17 may be larger or smaller than the bore 21 for the valve element (regulating piston) 6, as will become apparent. In this embodiment, which is suitable for many applications, it is the same bore.

Figure 7:
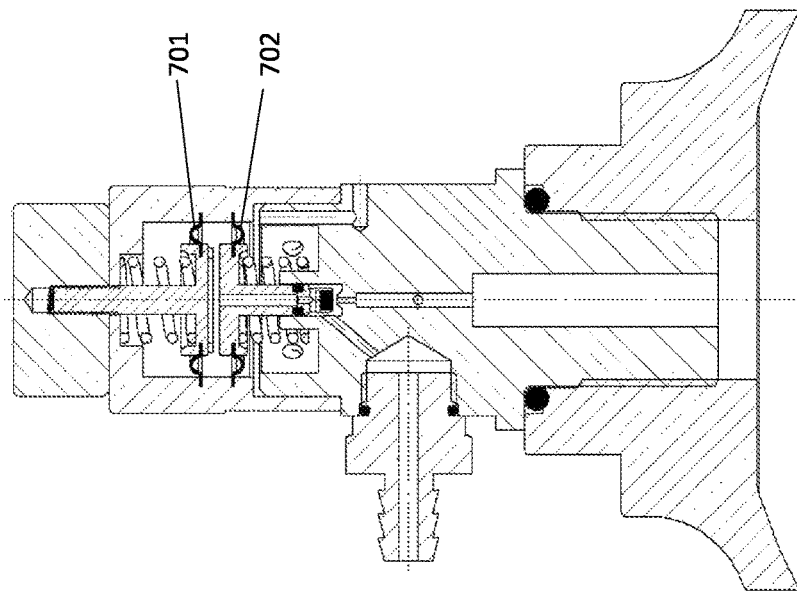
FIG. 7 shows an embodiment of the device of FIG. 1 showing the use of diaphragms in place of sliding seals, which may be advantageous for applications in which the lower friction of diaphragms is beneficial.

The closing sliding seal 18 could be replaced with a diaphragm to perform the same function, as can be seen in FIG. 7.

The closing piston 17 is movable between a first position (see FIG. 1b) and a second position (see FIG. 1a). In the first position, the closing piston 17 is in contact with the regulating piston 6 and the regulating piston seal 9 is in contact with the seat 10. In the second position, the closing piston 17 is located a distance above its first position. This distance is sufficient to allow the regulating piston 6 underneath, the range of movement necessary for it to move the seal away from the seat to the extent required to perform its regulating function (seen in FIG. 1*a*). Typically this distance would be at least a quarter of the diameter of the hole in the seat 14, depending on the application. The closing piston's lower surface defines an upper wall of the secondary pressure chamber 16. A lower wall is defined by the upper surface of the regulating piston 6. The chamber volume therefore depends on the separation between these two surfaces.

The closing piston is fitted with a stand-off 22 that prevents the faces on the closing 17 and regulating 6 pistons from making sufficiently close contact that they stick together. The stand-off 22 could alternatively be located on the regulating piston 6, or it could be a separate part. In all cases, the stand-off ensures that secondary chamber 16 is always of finite size and that gas is permitted to flow within.

A threaded shaft 102 of the closing piston 17 protrudes through the regulator housing 3 and is attached to a hand-wheel 101. Rotating the hand-wheel 101 accordingly moves the closing piston 17 up and down between the first and second positions.

When the hand-wheel 101 is turned in an opening direction, it is initially pulled downwards along the thread until its lower surface 103 contacts a top surface 104 of the regulator housing. Thereafter, the closing piston 17 is pulled upwards, away from contact with the regulating piston 6 and against the bias of the closing spring 19, to the open position as shown in FIG. 1*a*. The regulating piston 6 is accordingly free to regulate pressure.

When the hand-wheel 101 is turned in an opposite direction, the closing piston 17 will be driven towards the regulating piston 6 by the closing spring 19 relaxing. When it either contacts the regulating piston or becomes close enough to compress any fluid at secondary pressure in the secondary pressure chamber 16, the force from the closing spring 19 is such that it will overcome the force of the regulator biasing member 11, and bring the seal in sealing contact with the seat.

In order to overcome manufacturing tolerances and compression of the seal, it is necessary that the hand-wheel stops in a position in which it is clear of the regulator head. A gap 105 is seen in FIG. 1*b* between the lower surface 103 of the hand-wheel and the top 104 of the regulator head.

For intended function it is important that the pressure above the head of the closing piston is kept at ambient pressure. This chamber 24 is vented past the thread of the closing piston shaft 25. However, the vent could be a hole anywhere between the chamber and outside, for example the hole 311 of FIG. 3*a*.

Consider the situation in which the hand-wheel has been fully turned to its closing position, clear of the regulator head, as shown in FIG. 1*b*. The closing spring 19 then applies its maximum force through the closing piston 17 via the stand-off 22 to the regulating piston 6. This maximum force is set to be sufficient to overcome the opposing force of the regulator biasing member 11 when the seat and seal are in contact, plus a force sufficient to effect a seal between the seal and the seat at the highest pressure normally in the cylinder or the high pressure source.

If, at the point of closing, there is still pressure in the secondary pressure chamber 16, the pressure within this chamber acts substantially equally on the closing piston 17 and the regulating piston 6. That is, the force upwards on the closing piston 17 arising from the fluid pressure in the chamber 16 counteracts the downwards force arising from the closing spring 19. The net force transmitted through the regulating piston on the seat is therefore substantially constant. This arrangement therefore protects the seal from being damaged.

If, on the other hand, there is no pressure in the secondary chamber 16, the closing piston 17 will make contact with the regulating piston 6, or at least as close as permitted by the stand-off 22. The full force of the closing spring 19 is then applied to the regulating piston 6. As this is set to be the amount required to overcome the bias of the regulator spring 11 and to seal the seat, again the net force applied to seal the seat is limited to that intended i.e. below a level to cause damage to the parts.

Regardless of the secondary pressure in the regulator therefore at the point of closing, the use of a suitably-biased closing piston 17 means that the force on the regulating piston 6 is always mediated by the level of secondary pressure, ensuring that the net force on the seat is always that intended to be applied to effect the seal.

As will be clear to one skilled in the art, various design considerations apply to effective operation of the closing piston. For example, if the diameter of the smaller seal 7 of the regulating piston 6 is significant in relation to the diameter of the larger seal 8, the diameter 14 of the bore in which the closing piston seals should be reduced. The cross sectional area of the bore of the closing piston being approximately the cross sectional area of the regulating piston's larger bore 21 minus the cross sectional area of the regulating piston's small sealing bore 26. If the closing piston 17 and the larger seal 8 of the regulating piston 6 slide in differently-sized bores, then the stand-off 22 may be longer. This permits the closing piston to stay in its bore when in the closing position. See FIG. 6 for an example of this arrangement.

FIG. 1*c* shows a section 90 degrees from the section of FIGS. 1*a* and 1*b*, illustrating a possible cylinder assembly that includes the regulator of this invention. The assembly includes a filling port 28 with a check valve, to allow the cylinder to be filled, and a gauge or pressure indicator 30.

FIG. 1*d* is an isometric view of the regulator of FIGS. 1*a* to 1*c*.

Figure 2B:
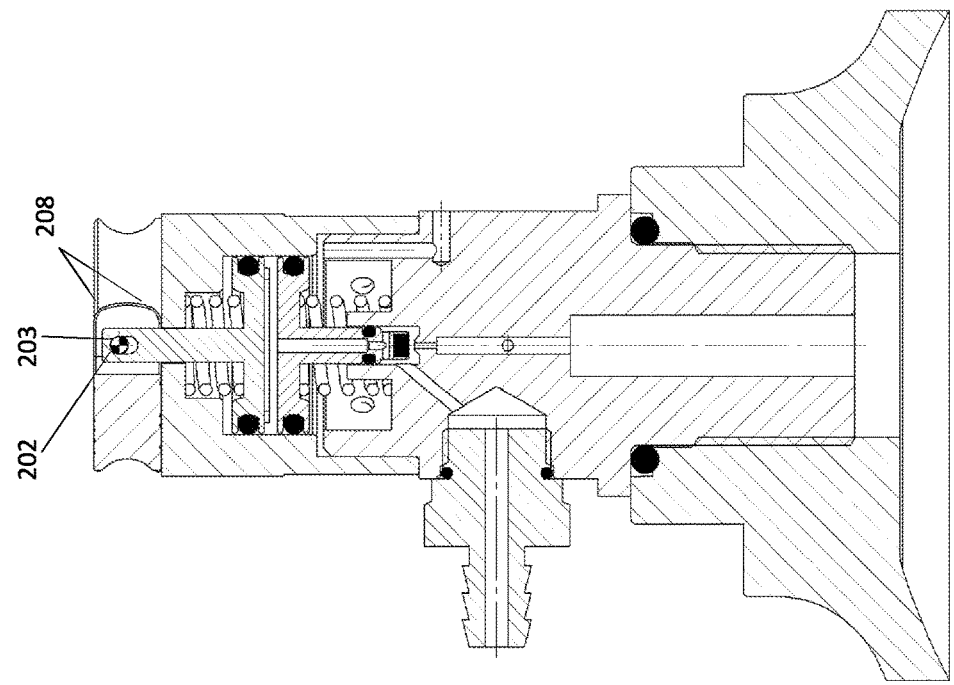
FIG. 2b is the device of FIG. 2a shown in the open position.
Figure 2A:
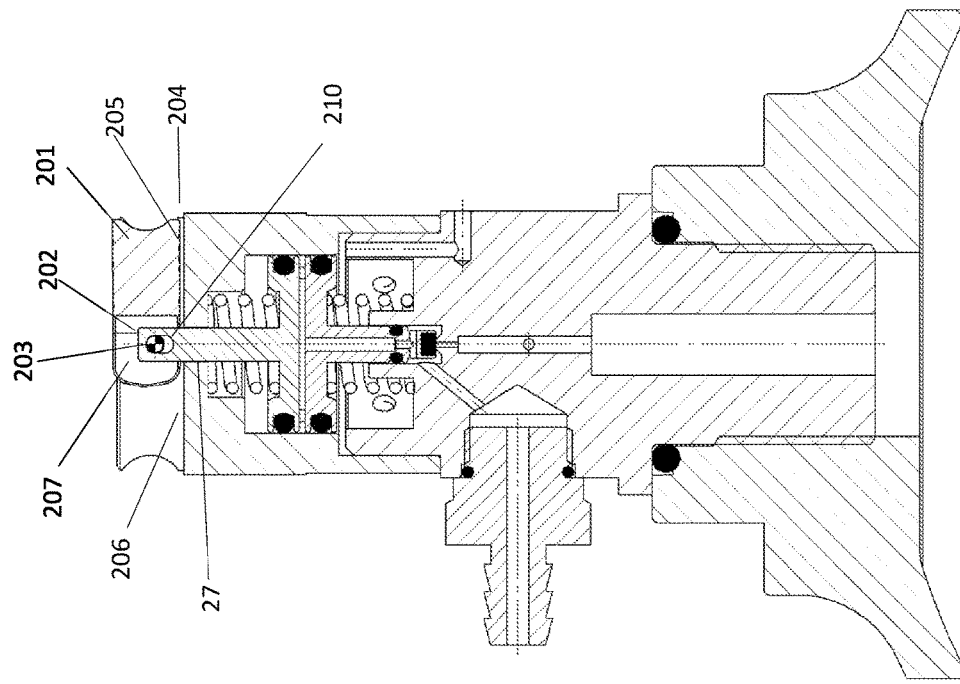
FIG. 2a is a second embodiment in which a cam lever is used to open and close the closing piston, the piston being shown in the closed position.

FIGS. 2*a* and 2*b* illustrate a variation of the embodiment shown in FIG. 1, in which a different mechanism is used to move the closing piston between its first and second positions. In this example, everything below the closing piston is the same as for the first embodiment and so will not be described further. The variation relates to the mechanism by which the closing piston is moved.

The closing piston has a shaft 27 that is attached to an operating lever 201 with an off-centre hole 202 in which a dowel 203 is retained. The shaft 27 of the closing piston fits into a recess 207 in the lever and includes a vertical slot 210. The dowel passes through both the slot 210 and the hole 202 to act as a pivot through which the lever 201 is joined to the shaft 27.

The lever 201 is movable between two positions. In the closing position shown in FIG. 2*a*, the dowel hole is closer to the lower side 205 of the lever, so the closing piston 19 is placed in contact with the regulating piston 6. The closing actuation means or closing spring 19 therefore forces the regulating piston shut. There is a clearance 204 between the underside of the lever 205 and the surface 206 of the regulator head, so that the closing of the regulating piston is guaranteed, despite part tolerances and variation in compression of the seal 9 on the seat 10.

In the second, open, position seen in FIG. 2b, the hole 202 and therefore the dowel 203 are positioned further away from the regulator head so that the closing piston is pulled up into the second, opening position, in which the regulating piston 6 is free to operate and so to allow low-pressure fluid to be delivered to the outlet 2.

The vertical slot 210 in the shaft 27 that retains the dowel 202 permits relative movement between the dowel 202 and shaft 27 in the vertical direction. Without this tolerance in the vertical direction, accidental knocking of the lever 201 in the closed position may result in a downward force being communicated through the shaft to the regulating piston and then to the seat, which accordingly risks being damaged. With the dowel 202 retained by the slot 210, such unintentional movement of the lever 201 is isolated from the remainder of the structure.

The shape of the dowel end of the lever gives a certain amount of over-centre action. The exact shape will depend on the balance between ease of use and prevention of inadvertent change from the first position to the second position, as is common with most controls. Known mechanical solutions could therefore be used to address these issues.

For example, if prevention of inadvertent actuation was a priority, corners 208 could be made more square, so that it is necessary to apply more force to the lever to move it from one position to the other. If ease of use was the priority, the lever could be made longer and the corners more rounded to remove the over-centre action, etc.

It will be clear to one skilled in the art that the hand-wheel of FIG. 1 and the lever of FIG. 2 could be replaced by any number of alternative mechanical arrangements to move the closing piston 17 between its first and second positions. Such arrangements could include, for example, but are not restricted to, a cam or a toggle action lever. The position of the lever could be varied to suit the application. For example, the lever could be pointing vertically up in one position and down in the other position.

The advantage of the lever arrangement of FIG. 2 over the embodiment of FIG. 1 is that the position of the lever is visible. The on/off state of the regulator can therefore be readily inferred from the position of the lever. For example, in the embodiment shown in FIG. 2b, the lever is pointing to the output 2, indicating that the regulator is on.

Figure 2C:
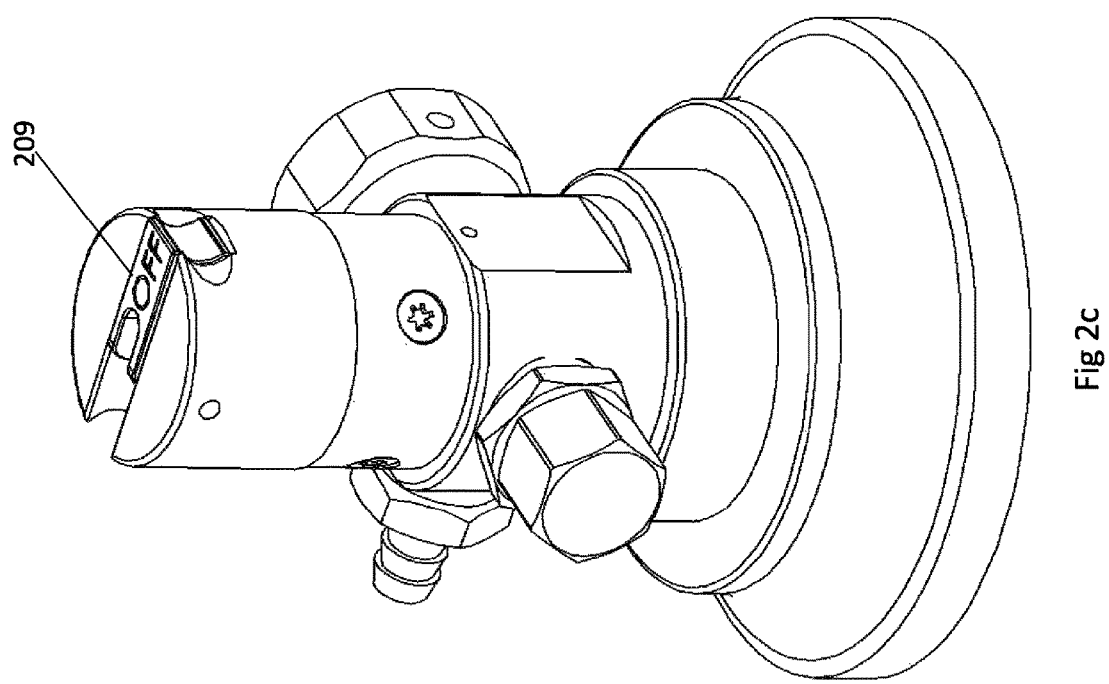
FIG. 2c is an isometric view of the embodiment of FIGS. 2a and 2b.

FIG. 2c is an isometric view of the valve of FIGS. 2a and 2b, where another advantage of the lever arrangement can be seen. Markings and/or colours on the visible side of the lever 209 can indicate the position of the lever, which would be helpful to a user by showing if the regulator is in the closed or open state. A clear indication of valve state is more difficult in the case of the hand-wheel of FIG. 1.

Figure 3B:
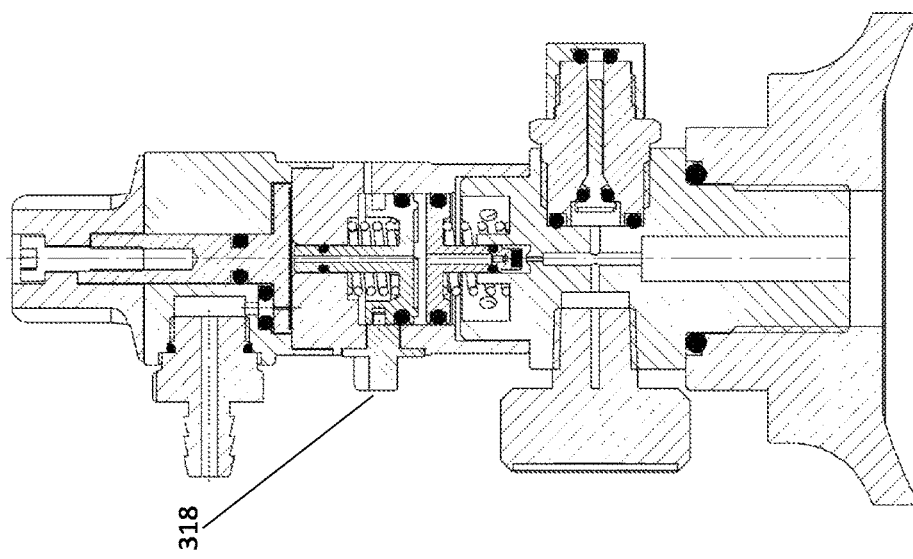
FIG. 3b is the embodiment of FIG. 3a, shown in the open position.
Figure 3A:
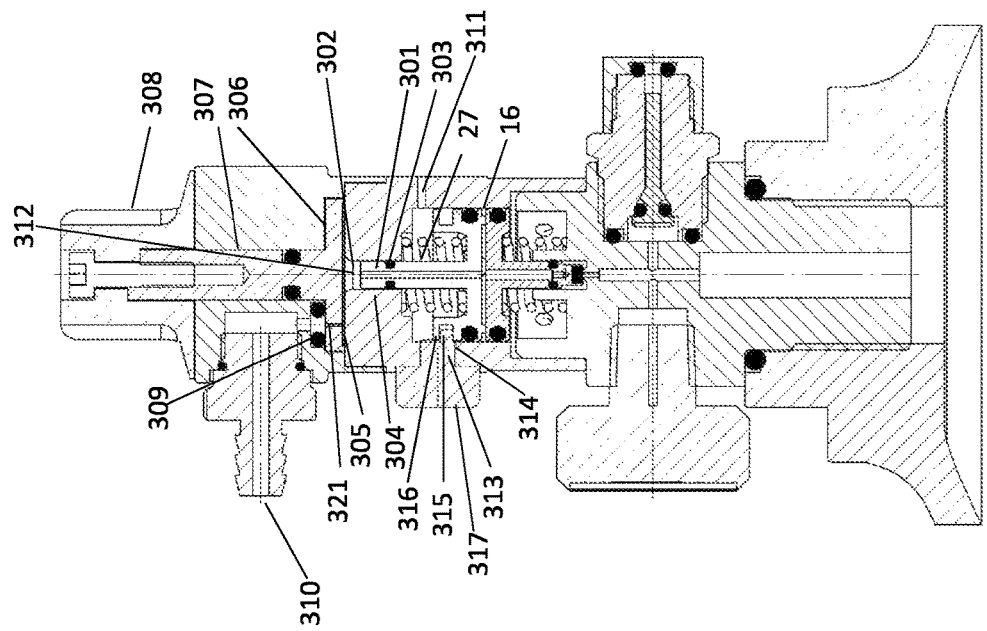
FIG. 3a is a third embodiment, shown in the closed position, in which the closing piston has a path through it to allow selectable orifices fitted above it to be in fluid communication with the low-pressure side of the regulator. The closing piston is moved through an off-centre pin on a shaft, rotated by an external knob.
Figure 3C:
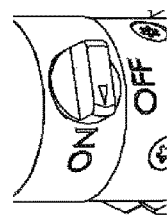
FIG. 3c is an isometric view of the embodiment of FIGS. 3a and 3b, showing the control in both positions.
Figure 3C:
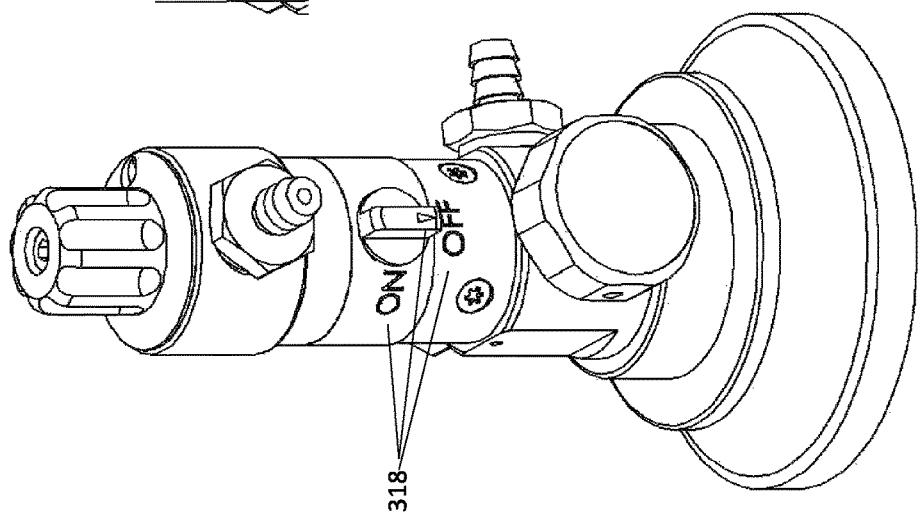

FIGS. 3a to 3c illustrate a further embodiment of a regulator with shut off mechanism in accordance with this invention. This embodiment shows, by way of example, an arrangement of selectable orifices within an assembly, each orifice being selectable for location in the reduced pressure output path of the present invention.

Everything below the closing piston is the same as in the previous figures.

The closing piston shaft 27 has a passage 301 through it, which puts a chamber 302 above the closing piston in fluid communication with the secondary pressure chamber 16 located between opposing surfaces of the closing and regulating pistons.

A head passage 304 extends between the chamber 24 in which the closing spring 19 is located and the upper chamber 302 and is sealed by a sliding seal 303 on the shaft of the closing piston that slides within it. Above the upper chamber 302 is a selectable orifice plate 306. This plate 306 includes a series of calibrated orifices drilled through the plate and positioned in an arc around the centre, towards its outer circumference. The orifice plate 306 is fixed to a rotatable shaft 307 that can be turned by an externally operable knob 308, such that the selected orifice may be lined up with a seal 309. This arrangement can control the flow delivered from the outlet 310 according to the orifice selected when the regulator is in the open (regulating) position and when there is adequate pressure supply.

In this embodiment therefore, each of the different-sized orifices may be selected an placed in the regulator output pathway. It is often desirable for these or other devices to be incorporated into a regulator, which can be achieved using this embodiment of the invention. Devices such as, but not limited to, a secondary regulator, a conserving device or the like could be fitted in place of the selectable orifices.

A vent 311 keeps the pressure above the head of the closing piston at ambient pressure, as the shaft of the closing piston is sealed.

This arrangement is advantageous in that the closing piston can be balanced. That is, if the seal on the shaft of the closing piston is of similar diameter to the small seal 7 on the regulating piston, the secondary pressure acting on the end of the shaft 312 balances secondary pressure acting on the small seal 7. This allows the closing piston and the regulating piston to operate in the same bore, regardless of the relative sizes of the small 7 and large 8 regulating piston sealing diameters.

In this embodiment, an upper mechanism cannot be used to move the closing piston, because of the location there of the shaft 307 for the selectable orifice. The closing piston is therefore moved between its first position and second position by means of a rotatable fitting 313 that extends through an aperture 314 in the side of the regulator head. The fitting 313 includes an off-centre pin 315 that is located in a complementary groove or slot 316 in the closing piston. Rotation of the fitting 313 causes the pin 315 and hence the closing piston to move up and down within the regulator. A knob 317 with position indication 318 (more clearly visible in FIG. 3c) allows the user to rotate the shaft and move the closing piston from the closing position as seen in FIG. 3a to the second position as seen in FIG. 3b.

In order to take tolerances into account, when the knob and closing piston are in the closed position, there is a clearance above and below the off centre pin 315, between it and the groove or slot 316 to ensure that the closing piston is not hindered from contact with the regulating piston, and that there is no additional force applied by the pin to the closing piston in either direction, that might otherwise increase or decrease the force the closing piston applies to the regulating piston.

This embodiment is further advantageous in that controls for selecting the orifice, etc. can be located above (relative to the orientation shown in the figures) the closing piston. This can be an advantage, which makes for a more convenient location of controls, that would be difficult to achieve with the previously-described embodiments.

As before, there are many mechanical alternatives to the shaft with an off centre pin. Similar considerations apply as outlined in respect of the previously described embodiment with regard to inadvertent operation and ease of use.

FIG. 3c is an isometric view of the regulator of FIGS. 3a and 3b, showing the knob in both positions, more clearly showing the position indication 318.

Figure 4:
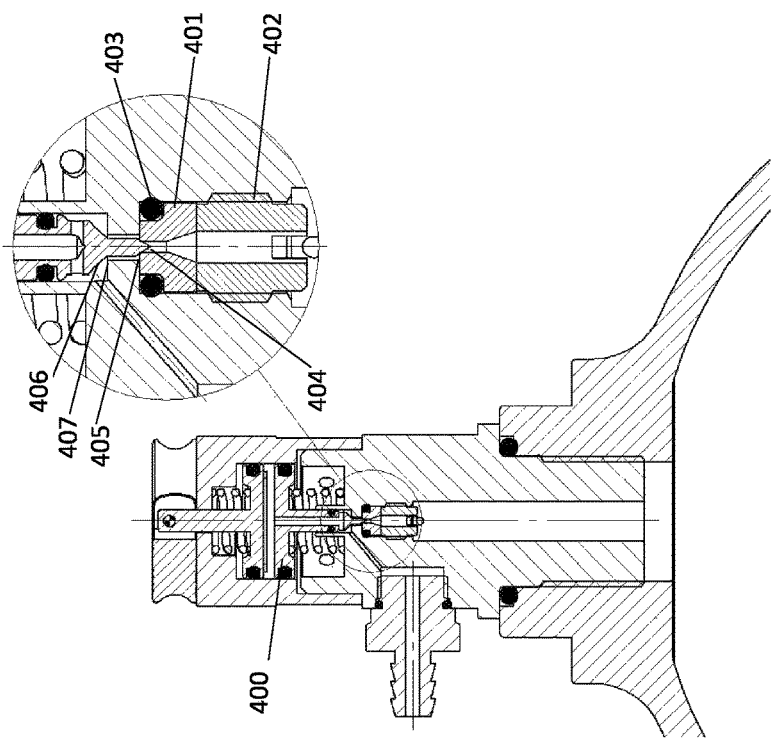
FIG. 4 shows an embodiment with an alternative arrangement of a piston, in which the seal is an annular disc and the piston has a conical sealing nose. There is also a second conical sealing nose that would seal against the edge of an orifice in the body if the first seal failed.

FIG. 4 shows an embodiment that is similar functionally to the previous embodiments but which has an alternative structure of the seat and seal.

The seat in previous embodiments ideally has a flat annular surface that is to be sealed by a planar seal on the end of a piston. For optimal sealing, the surface has to be flat within a particular tolerance, which may be on the limits of the ability of conventional machining to achieve. Accordingly, the embodiment shown in FIG. 4 makes use of an alternative structure of seat and seal that is not so exact with structural requirements.

With reference to FIG. 4, the seat is constructed from an annular ring 401, with central hole 405, which is fabricated from a material that is typically used for the seal on the piston. For example, nylon, Vespel, PEEK, Kel-F, PTFE or similar. This annular ring 401 is pushed in from the bottom of the valve body, retained with a threaded retainer 402 and sealed with an o-ring 403. A filter (not shown) is optionally located between the seal and the retainer.

The sealing end of the regulating piston 400 is formed with a tapered pin 404, which seals against the edge of the hole 405 in the annular ring when the two are in contact.

The arrangement has two significant advantages over the previous design of seal and seat. First, the parts are easier to manufacture with conventional machine tools and techniques. Secondly, the effective area over which the high pressure acts on the piston is reduced in comparison. This results in a smaller load arising from the high pressure gas in the cylinder acting on the regulating piston. This, in turn, improves the ability of the regulator to maintain constant output pressure as the cylinder empties.

It also offers the potential for a refinement that adds a further significant advantage over the previous design. As shown in the diagram, the regulating piston 400 has a second conical feature 406, of larger diameter than the tapered pin 404 and positioned further away from the seat. This second conical feature 406 is sized such that it could seal directly on the edge 407 of a hole in the regulator body. This safety feature would come into play in case of damage or loss of the primary seat 405, for example if the annular ring 401 ignites in oxygen. Following such a loss, the ability of the piston 400 to form a secondary seal will prevent full uncontrolled cylinder pressure being released at the output, thereby making the regulator safer. Moreover, although performance would be degraded, the secondary seal will permit the regulator to retain some regulating function.

Figure 5B:
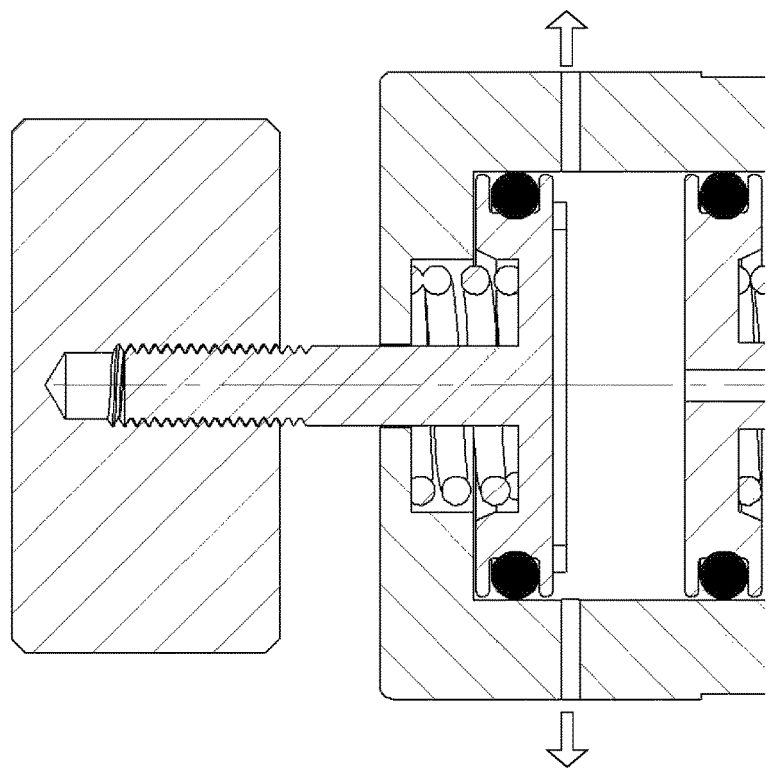
FIG. 5b shows the embodiment of 5a, in which excess secondary pressure above the regulating piston has pushed the closing piston to a venting position.
Figure 5A:
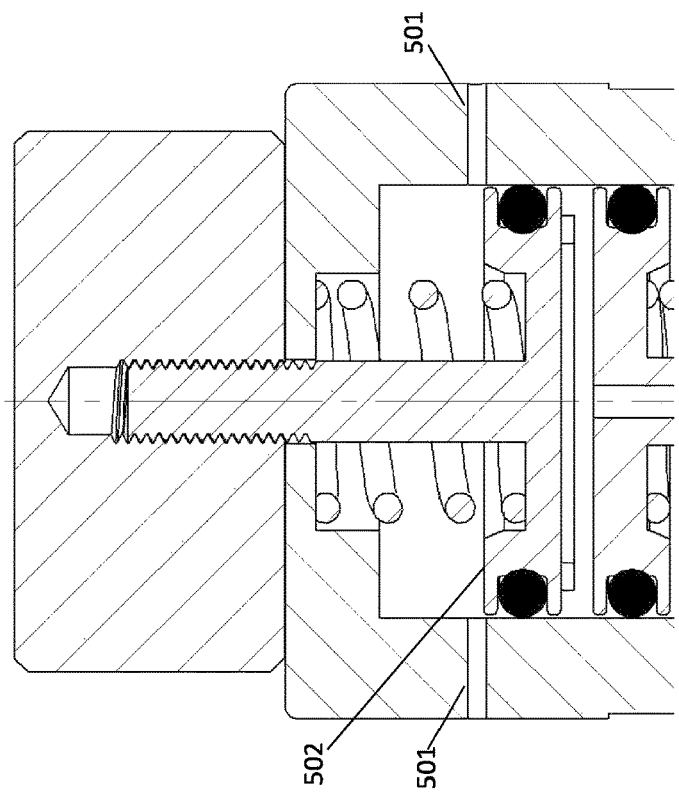
FIG. 5a shows a variation of the first embodiment, in which the closing piston is in a position preventing secondary pressure from reaching pressure relief vents.

FIGS. 5a and 5b illustrate an adaptation in which the closing piston is arranged to perform the function of a pressure relief valve. In a situation in which the seat 10 and seal 9 (see FIG. 1a and FIG. 4) are not able to seal, for example, in the event of debris or damage between the two parts, excess pressure will build up in the low pressure parts within the regulator body. It is therefore advantageous to be able to release this pressure, and a pressure relief valve is a common requirement in regulators. In some embodiments on this invention, the closing piston may be conveniently adapted to perform this function. Use of a part in this manner to fulfil a dual role reduces the number of parts, which in turn reduces cost.

FIG. 5a shows a variation of the embodiment shown in FIG. 1a, in the open, (regulator operating) position. A passage or passages 501 extend from a chamber above the closing piston 502 to outside the valve. The passages 501 are located just above the highest position in which the closing piston normally operates and so provide fluid communication between the top side of the closing piston 502 and ambient.

At normal operating pressure, the closing piston 502 is held in a position that is clear of the regulating piston and therefore allowing it to fulfil its normal regulating function. The closing actuating means or spring is applying a greater force to the piston than the regulated pressure multiplied by effective piston area. Thus the closing piston will not move.

With reference to FIG. 5b, if the regulated pressure increases significantly above normal operating levels, for example in the case of the seat or seal being damaged, excessive regulated pressure will build up in the chamber between the pistons. The force generated by this pressure acting over the effective area of the closing piston overcomes the force from the closing actuating means, and moves the closing piston upwards, away from the regulating piston. As the closing piston moved upwards, it moves past the entrances to passages 501. The passages 501 now connect the excess pressure to ambient, allowing it to be vented.

Figure 6:
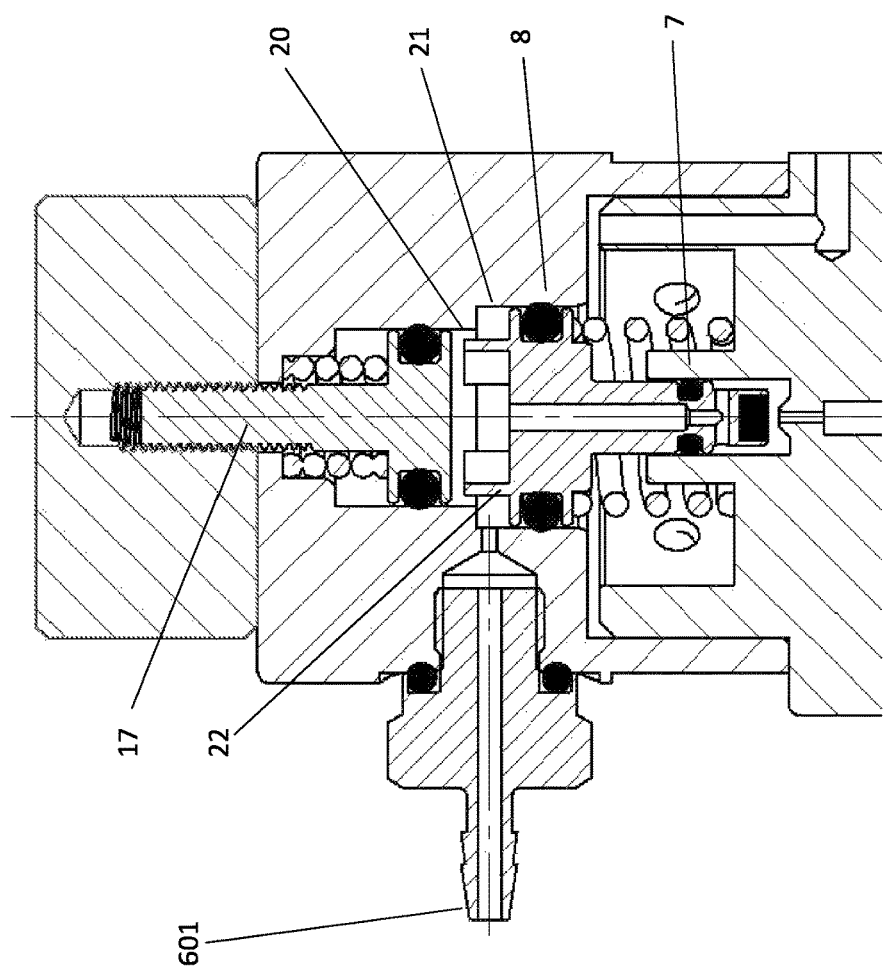
FIG. 6 shows a further embodiment in which the regulating piston is small. The sliding seal diameter of the closing piston is therefore smaller to take into account the small reducer piston seal area working in the opposite direction to the large reducer piston seal area. It also shows an alternative outlet position.

FIG. 6 shows a further embodiment, a variation on that shown in FIG. 1, in which the diameter of the large seal 8 of the regulating piston 6 is reduced. The relative sizes of the regulating piston seals 7, 8 are now such that secondary pressure acting on the area of the larger seal 8 minus that acting on the area of the smaller seal 7 can be balanced by a pressure acting over a smaller-diameter closing piston 17 surface area. The closing piston head is therefore in a smaller bore 20 than the bore 21 for the head (larger seal) of the reducing piston.

A longer stand off 22 is required to ensure that the two pistons can come into contact and yet still operate in their respective bores. In this embodiment, the stand off 22 is shown as part of the regulating piston.

An alternative outlet position 601 is also shown in this figure, by way of example.

FIG. 7 shows an embodiment of the device of FIG. 1 in which the piston larger sliding seals 8, 18 are replaced with diaphragms 701, 702. Diaphragms are components that operate with reduced friction in comparison with pistons, which may be advantageous in certain applications.

It will be apparent to one skilled in the art that the embodiments thus far described include variations on a basic theme: applying a closing force to a regulating piston 6 by pushing down on a closing piston whose contact with the regulating piston is mediated by secondary pressure. The variations are generally independent of each other and, as such, can be included individually, or together in different embodiments of the invention. Thus, the lever closing mechanism of FIG. 2 can be implemented in the same embodiment as the FIG. 4 design of seat and seal. This much will be apparent to one skilled in the art.

Figure 8B:
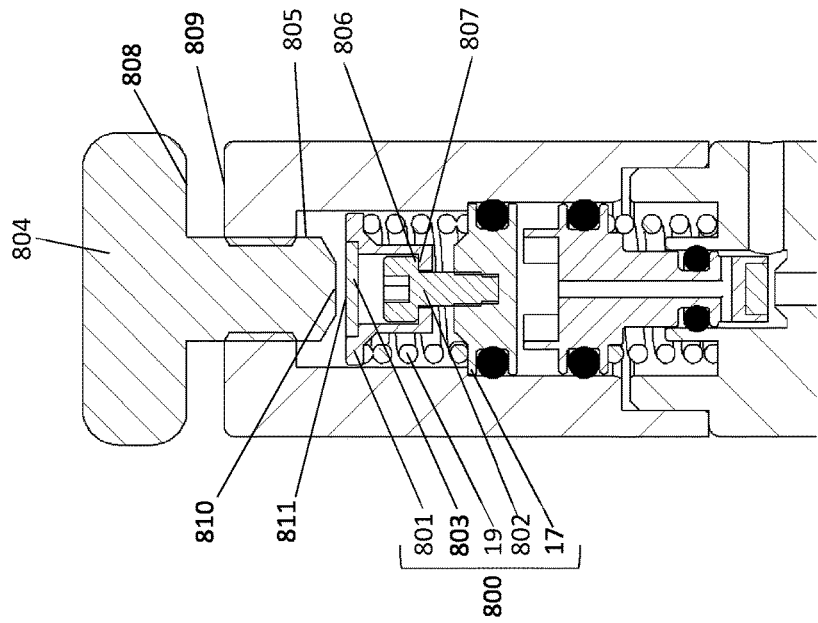
FIGS. 8a and 8b show a further embodiment of the present invention, in which the closing spring can be pushed from the top to close the valve, rather than pulled up to open.
Figure 8A:
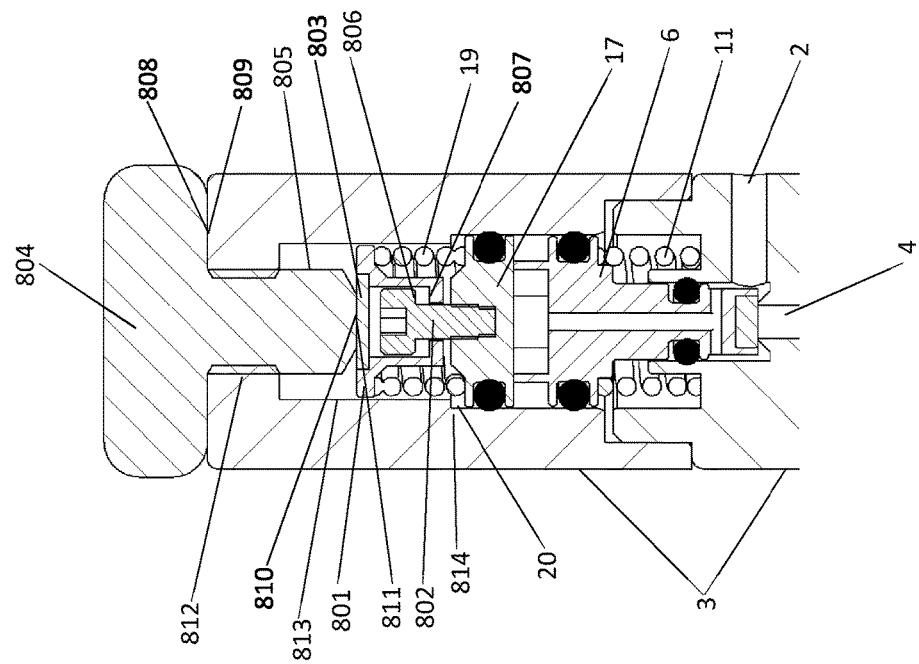

FIGS. 8a and 8b illustrate an alternative embodiment of the invention, in which the closing piston again applies a force to close the regulating piston that is mediated by secondary pressure. In this embodiment however, there is a difference in operation: the mechanism of opening and closing the valve is reversed. That is, instead of pulling the closing piston 17 upwards for regulating function, the piston is pushed downwards to shut off the valve. This allows for alternative ways of packaging the regulator.

Features common to previous embodiments are similarly referenced. These are noted only so far as necessary to enable an understanding of the differences, which will be fully described.

The valve is shown in its open and regulating state in FIG. 8b. That is, gas flows from the input passage 4 at high pressure through the regulator to the secondary output port 2 at the regulated pressure. In this state, a handwheel 804 with threaded shaft 805 running in a threaded hole 812 in the regulator housing 3 is turned to a position in which the end of the shaft 805 is clear of a spring capsule 800.

The spring capsule 800 contains the closing spring 19 in a compressed state. The capsule 800 comprises a spring compression part 801 that is fitted to a top end of the closing spring 19. A screw 802 is fitted through a lower floor 807 of the spring compression part 801 and screwed into the closing piston 17. In the position shown, a bottom face 806 of the screw head makes contact with the lower floor 807 of the spring compression part 801. The screw 807 and spring compression part 801 therefore cooperate to hold the closing spring in a compressed state. The closing spring 19 is compressed to a degree that is a small amount less than that which is required to provide the total load that it is necessary to apply to the regulating piston 6 in order to close the valve. A cover 803 to the spring compression part 801 provides a face 811 that can be pushed on by the handwheel 804.

With the handwheel free of the spring capsule 800, any secondary pressure in the secondary pressure chamber 16 will push the closing piston upwards. Upward motion is limited by an inward step 814 within the closing piston bore 20 that will be contacted by a face of the upwardly-travelling piston.

The compressive force of the closing spring 19 is therefore constrained within the spring capsule 800, which operates as a unit with the closing piston 6. In this situation, the closing spring cannot affect the regulating piston. The closing piston 17 is pushed clear of the regulating piston 60 by secondary pressure, the regulating piston 6 is free to regulate pressure as previously described.

If the handwheel 804 is turned, it moves downwards until its lower face 808 comes into contact with the top 809 of the regulator housing, as shown in FIG. 8a. During this motion, the end 810 of the shaft 805 of the handwheel contacts and pushes downwards the top surface 811 of the cover 803 of the spring capsule 800. The spring compression part 801 is pushed downwards and loses contact with the bottom face 806 of the screw head, the screw being fixed to the closing piston 17. The closing spring 19 is now therefore compressed between the end 810 of the shaft and the upper surface of the closing piston. As the shaft is fixed, the force of the spring pushes the closing piston 17 towards the regulating piston 6. Although the cover 803 is moved downwards, it remains clear of the screw head, ensuring no contact is made. Similarly, separation between the closing piston 17 and spring compression part is also maintained. This arrangement ensures that the only load transferred through the closing piston 17 to the regulating piston 6 is the closing spring 19 load. As the handwheel cannot be screwed down any further, due to the limit provided by the regulator housing, the additional degree of compression imparted to the spring is fixed to ensure that spring load is sufficient to seal the seat without overloading.

As before, it will be clear to one skilled in the art that various features of the other embodiments of the invention previously described can optionally be incorporated in this embodiment. For example, the handwheel can be replaced by any one of the many known mechanisms to push down and release force, including cams, toggle mechanisms, etc.

Figure 9B:
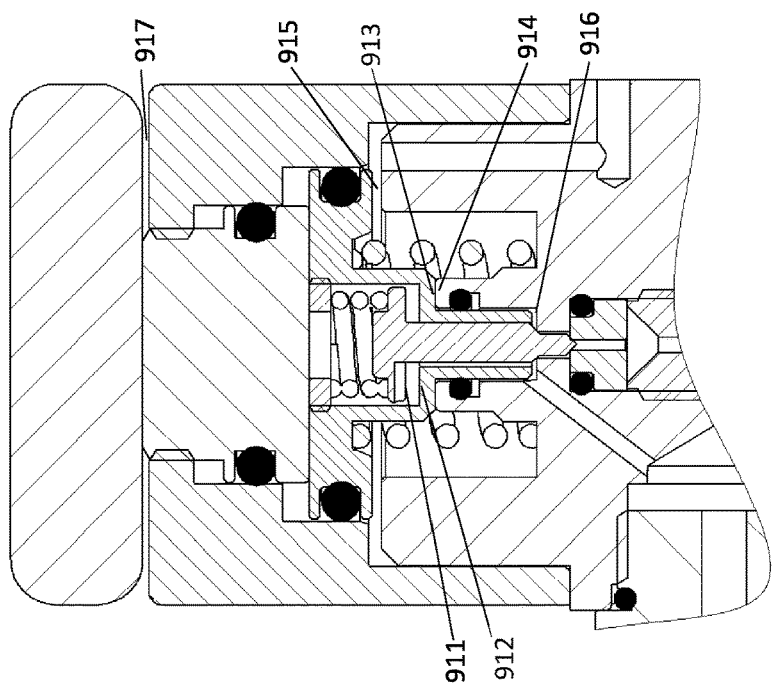
FIGS. 9a and 9b show a further embodiment of the current invention in which the regulating piston comprises two elements, which are separable to prevent overloading the seat on valve closure.
Figure 9A:
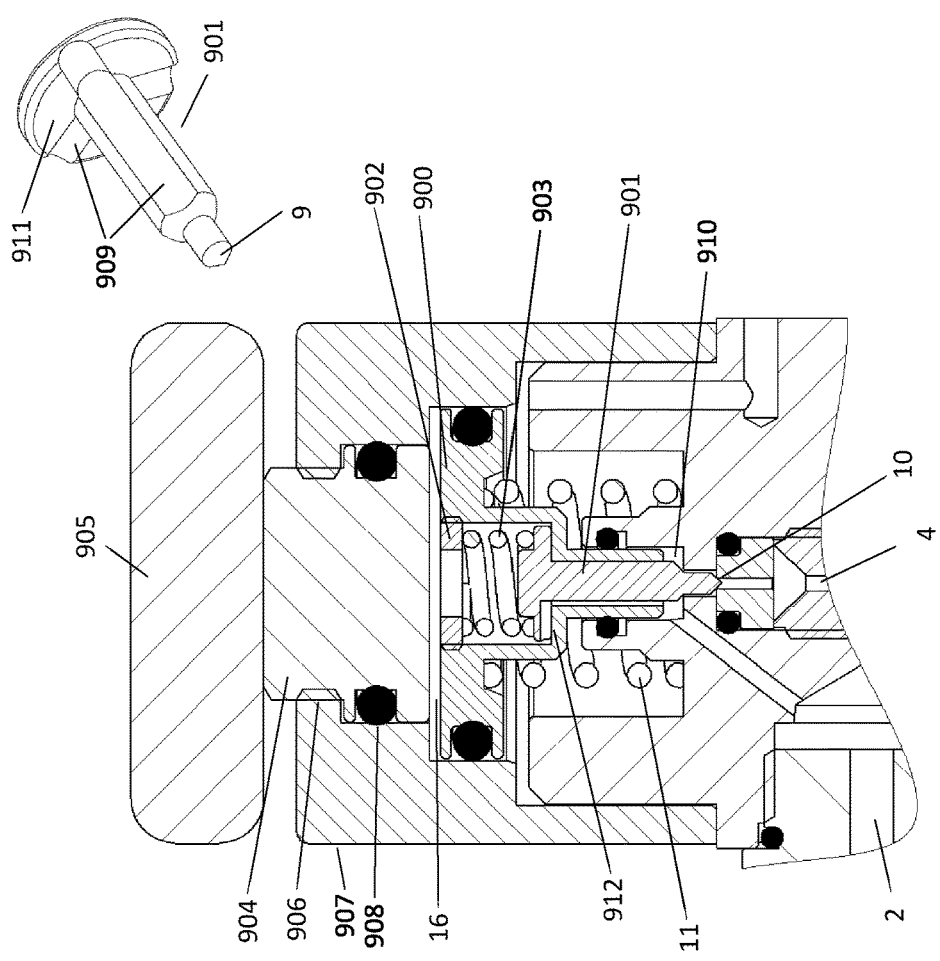

FIGS. 9a and 9b illustrate a further embodiment of this invention. In this embodiment, the regulating valve still includes a safe shut-off mechanism that does not overload the seat, but this mechanism is not based on mediating the closing force by secondary pressure. Rather it is based on the regulating piston being constructed from an arrangement of nested piston parts that act as a unit when the valve is regulating but are separable during closure. When separated, the effect of secondary pressure is disconnected from the inner component, which effects the seal.

FIG. 9a shows this embodiment of the invention in an open and regulating state. The regulating piston comprises an inner sealing element 901 that can be slidably guided inside an outer sliding casing 900. An inner face of a head 911 of the sealing element 901 is pushed by a closing spring 903 against a face 912 on the outer sliding element 900. The closing spring 903 is retained, advantageously in a compressed state, between the head of the inner sealing element and a retainer 902.

The inner sealing element 901 includes one or more cuts 909 in its outside diameter to provide a gas passage between a low-pressure region 910 just above the seat 10 and the secondary chamber 16 above the top of the regulating piston, while still allowing it to be guided within the outer sliding element 900.

In normal use, the load applied by the closing spring 903 is in excess of the sealing loads encountered and so the inner sealing element 901 is fixed against the face 912 of the outer sliding element. This means that, in this arrangement, the two parts 900, 901 are held essentially rigidly together and will move as a single unit within the regulating piston bore.

A handwheel 905 is arranged to move a threaded piston 904, with threads 906 above a sliding seal 908 (shown as an "o" ring) provides an actuation mechanism to close the valve. The seal 908 prevents gas from the secondary pressure chamber 16 leaking past the actuation mechanism.

In the arrangement shown in FIG. 9a, in which the valve is open and regulating, the threaded piston 904 is raised clear of the regulating piston 900, 901, leaving it free to operate. As noted above, as a result of the closing spring 902 compression, the inner sealing element 901 is held rigidly to the outer sliding casing 900 and they will move as a unit, providing a regulating function. That is, if the valve is open, high-pressure gas passes through the seat 10, between the two parts 900, 901 of the regulating valve and to the secondary pressure chamber 16. As the secondary pressure builds, it serves to press the head of the outer sliding casing 900 back towards the valve seat 10. The casing 900 moves with the inner sealing element 901, which therefore seals the seat by means of the regulating piston tip 9. Following standard regulator operation, withdrawal of gas at secondary pressure from the outlet, results in a fall in pressure, the regulator biasing member 11 then pushes the outer sliding casing 900 away from the seat 10, the inner sealing element 901 moves with it, removing the tip 9 from sealing the seat 10 and opening the valve to replenish the withdrawn gas.

When it is required to turn off the regulator, the handwheel 905 is turned to lower the threaded piston 904 to push down against the head of the regulating piston 900, 901. The piston 900, 901 is pushed down beyond the point at which it normally operates. The tip 9 of the inner sealing element is brought into contact with the seat 10 and further movement, because of the rigid structure of the components, results in the head 911 of the inner sealing element moving away from the face 912 of the outer sliding case.

Regardless therefore of the force applied by the actuation mechanism 904, 905, or of the level of secondary pressure within the chamber 16, the force applied by the inner sealing element 901 as it seals the seat 10 is limited to the maximum load from the closing spring 902. This is set to be sufficient to effect a seal between the seat 10 and piston tip 9, but not to cause damage to either part. The spring is also loaded to a level that is capable of being sustained over the range of possible part tolerances. Moreover, dimensions of the parts ensure that the spring 902 is above solid height and therefore always exerting a spring force on the tip.

This disconnect between inner sealing element 901 and outer sliding casing 900 separates the influence of actuation mechanism and secondary pressure from the action of sealing the seat. That is, the actuation mechanism and secondary pressure apply force to the outer sliding casing 900, whereas the seal is effected by the inner sealing element 901. The sealing force can accordingly be set to be determined only by the compression of the closing spring 902. This is set so as to avoid damage to either the seal or sealing tip.

An end stop can be used to limit the travel of the regulating piston 900, 901 downwards. If it travels too far, the closing spring 902 will ultimately reach its maximum compression and any further closing force will begin to be transferred through the outer sliding casing 900 to the inner sealing element 901 and the tip 9. In the embodiment shown in FIG. 9, the stop is provided by a step 914 on the regulator body that encounters a face 913 on the underside of the outer sliding casing 900. One skilled in the art will readily appreciate that other stopping arrangements are possible. For example, the underside of the head of the outer sliding casing against the top 915 of the regulator body.

One skilled in the art will further appreciate that the seal shown in this embodiment could be exchanged for the planar arrangement shown in other embodiments and vice versa. The actuation mechanism could alternatively be a lever, a cam, a toggle or other mechanical arrangement by which a load is applied to the top of the regulating piston to effect closure and by which a load is removed to effect opening.

In comparison with the previously-described embodiments that make use of a closing piston to negate the effect of secondary pressure when shutting off a regulator, this FIG. 9 embodiment offers a more compact construction. The two parts of the regulating cylinder are nested inside each other, rather than being placed one on top of the other as is the case for the regulating and closing pistons. This design can therefore be used advantageously in smaller valves and cylinders.

For some applications, it may be necessary to include a relief valve in the regulator in order to protect its components from damage by a build up of pressure in the low pressure area following a leak at the valve seal, for example as a result of damage to the seat. Prior art regulators of the type that seal on the high pressure side of the valve include an inherent safety mechanism in that any pressure build up will tend to seal the valve and so control the leak. This is not the case with regulators in accordance with this invention. Safety relief valves however are well known and it will be apparent to one skilled in the art which designs may be suitable for implementation with the various embodiments of this invention. Alternatively or additionally, the sealing tip 9 of the embodiment shown in FIG. 9 may be replaced with the sealing stem shown in FIG. 4 in which a second, larger, conical sealing section is able to seal against a secondary seat in the valve in the event that the primary seat fails.

Figure 10C:
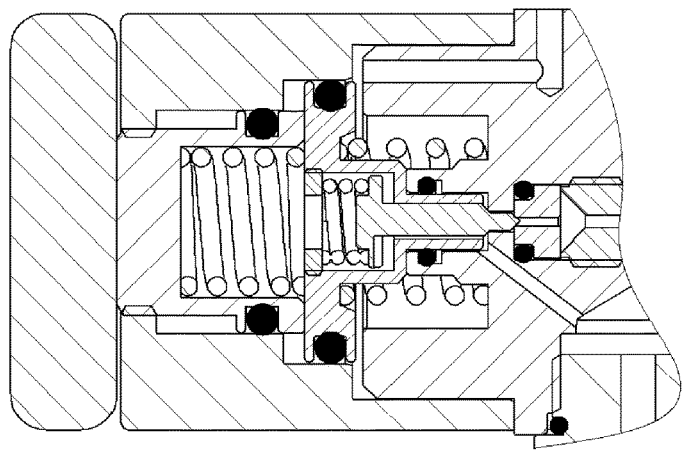
FIGS. 10a to 10c show an embodiment of the current invention, a variation of that shown in FIG. 9, in which a regulator is adapted to provide a variable output pressure, rather than simply switching on and off.
Figure 10B:
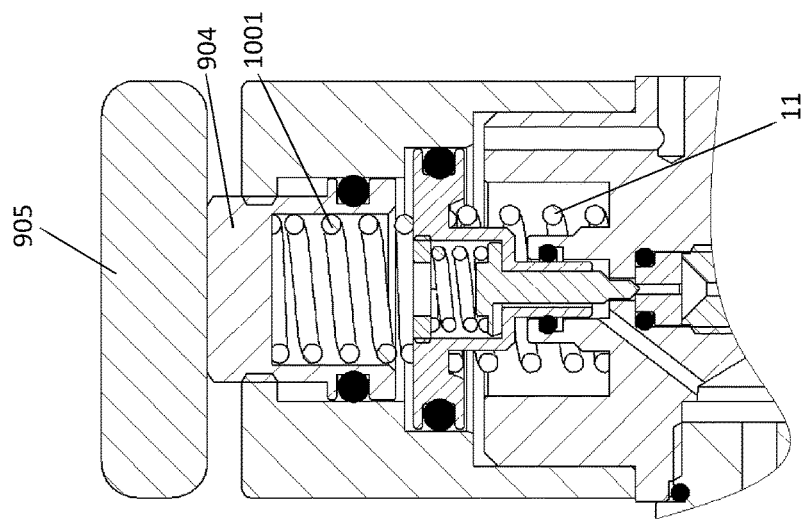
Figure 10A:
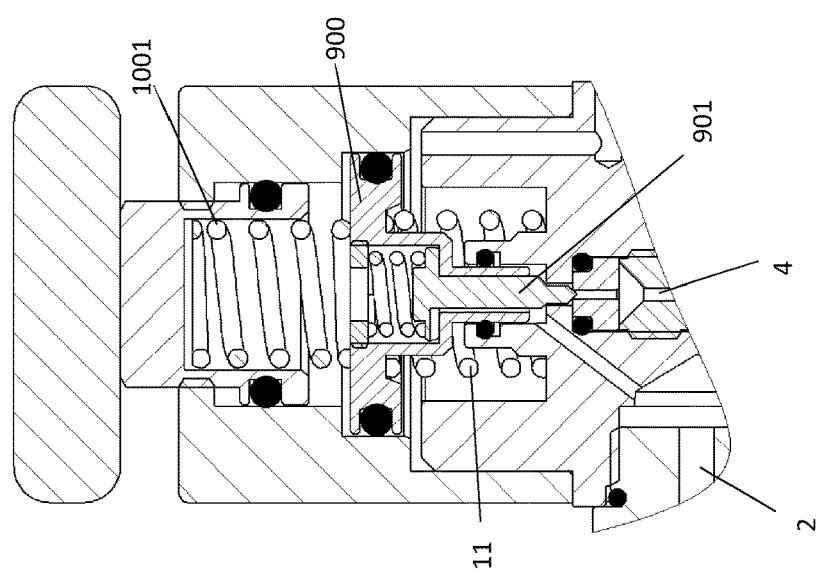

FIGS. 10a, 10b and 10c illustrate an embodiment of the present invention with a different application from previously-described embodiments. As set out earlier in this document, the disadvantage of prior art regulators that seal on the low pressure side of the valve is that there is no satisfactory mechanism by which to turn such a regulator off and that it is not straightforward to construct a variable output version. FIGS. 1-9 illustrate various embodiments of regulators with an improved shut off mechanism in accordance with one application of the invention. With reference to FIG. 10, there will now be described an alternative application in which the effect of secondary pressure is disconnected from the sealing mechanism to provide a variable-output regulator.

The embodiment shown in FIG. 10 is similar to that described in relation to FIG. 9, the one difference being the addition of an adjustment spring 1001 that is located within the actuation mechanism and fixed, in compression, to the top of the dual-component regulating piston.

In FIG. 10a, this embodiment is shown in its fully open and regulating to maximum output position. The adjustment spring 1001 is at its minimum compression, which is largely insufficient to affect movement of the regulating piston 900, 901. The piston 900, 901 is accordingly free to perform its regulating function. As with standard regulators, the output (secondary pressure) level is determined by the loading of the regulator biasing member 11.

With reference to FIG. 10b, there is shown the regulator of FIG. 10a providing an output pressure level that is not determined solely by the loading of the regulator biasing member 11. In this arrangement, the threaded piston 904/handwheel 905 have been moved downwards, towards the valve to compress the adjustment spring 1001. The degree of movement can be varied to enable selection of a desired spring compression.

When the adjustment spring 1001 is compressed, it exerts a force that urges the regulating piston 900, 901 towards the valve seat, countering the force provided by the regulator biasing member 11. The net result is an effective regulating force provided by the difference between the regulator member force and the adjustment spring force.

As described previously, this effective regulating force is, in large part, balanced by the secondary pressure built up in the chamber 16 above the regulating piston. This therefore governs the level of secondary pressure and hence output pressure. Varying the loading on the adjustment spring 1001 therefore provides a means to adjust output pressure in a regulator valve that seals on the low pressure side of the valve.

The adjustment spring 1001 can be loaded to give a regulated output pressure anywhere between the full regulated output of FIG. 10a, in which the adjustment spring applies no load, to zero pressure, when the load applied by the adjustment spring is substantially equal to that supplied by the regulator biasing member.

An operator can carry out an iterative adjustment of the adjustment spring 1001 until the desired output pressure is achieved. Alternatively, a range of settings could be pre-calibrated.

If the adjustment spring 1001 is compressed beyond that required to generate zero pressure output, then the situation shown in FIG. 10c will be reached. The forces involved in closing the valve are identical to those described in relation to FIG. 9b. That is, as the adjustment wheel is turned, the force on the regulating piston 900, 901 increases. When the net force exceeds that of the closing spring 902, the maximum permitted force is being applied between seat 10 and seal 9 and so the inner sealing element 901 and outer sliding casing 900 will separate. Sealing force is therefore maintained at that permitted by the closing spring, which is insufficient to damage the seat, and the valve is turned off.

In the arrangement shown in FIG. 10c, the degree to which the adjustment spring 1001 can be compressed is limited by the housing of the actuation mechanism 904, 905. This is set to be greater than the compression required to provide regulated output at zero pressure but, as can been seen in the Figure, the housing itself is now in contact with the top of the regulating piston 900, 901. Further movement of the housing will result in the outer sliding casing 900 being pushed down directly by the actuation housing, until the limit of casing movement is reached.

Advantageously, the point at which separation of the components of the regulating piston occurs is arranged to be a situation in which marginally more compression is applied to the adjustment spring than that required for zero output pressure. This may be achieved by an arrangement in which zero pressure output is obtained when the housing of the actuation mechanism is just about to make contact with the outer sliding casing 900. That is, just before the point of maximum spring compression. Moving the actuation mechanism beyond this point results in the casing 900 being pushed forward relative to the inner sealing element 901.

In an alternative arrangement, closure may be achieved solely by the action of the adjustment spring and not by the base of the actuation mechanism contacting the top of the regulating piston, which is therefore unnecessary. Either design is possible.

The variations disclosed in respect of previously described embodiments, may also be incorporated in this embodiment of the invention, as will be apparent to one skilled in the art. This is particularly the case for those variations described in relation to the design of regulators shown in FIG. 9. By way of a further example, the pistons with sliding seals shown in FIG. 9 may be replaced with diaphragms, according to design needs.

In an alternative embodiment, the adjustment mechanism 904, 905 with spring and moveable housing may be replaced by an adjustment piston that may be loaded by pressurising a chamber above it. When fluid flows into this chamber, the piston is pressed downwards onto the regulating piston 900, 901 to which it applies a load. The magnitude of this applied load is variable, being dependent on the pressure of fluid in the chamber. That is, output pressure from this regulator design may be set by use of a pilot piston arrangement.

In another alternative embodiment, the adjustment spring is arranged such that the regulator is held in a closed state by the load of the adjustment spring, not by contact between the regulating piston and adjustment piston. This leaves the regulating piston free to open and regulate. The output pressure can then be varied by pressuring the chamber around the regulating spring with a pilot pressure. A threshold pressure would be required to overcome the resultant closing force, then the output pressure would rise linearly with the pilot pressure.

The design of variable-output regulator in accordance with this invention is advantageous in that it provides for more accurate regulation in comparison with the prior art. in order to ensure accurate regulator function as an input cylinder empties, it is desirable to minimise the influence that input pressure has on secondary pressure output. As the input pressure acts through the area of the valve seat, one approach to this is to minimise the area of this seat. There is a limit however: the seat must be large enough to pass the fluid flow specified for the regulator at the lowest cylinder pressure.

The use of a pin or shaft that passes through the seat in prior art variable-output designs forces the seat to be larger in diameter than dictated by flow requirements: additional space must be included to accommodate the shaft. The sealing area for the high-pressure seat is therefore larger that it needs to be purely to pass the flow. The result is that the force variation on the regulator due to supply pressure is greater than for a regulator that is sealing on the low pressure side, for which a shaft is not required.

This can be compensated in prior art designs by making the piston or diaphragm larger, but this in turn requires a larger regulating spring and the overall result is that the regulator is bigger and consequently more expensive.

The present invention lends itself to a design of variable-output regulator that seals on the low-pressure side of the seat, thereby obviating any requirement for a shaft or pin and thereby avoiding the disadvantages of the prior art. A regulator in accordance with the present invention can be made smaller and yet with accuracy comparable to those of the prior art. Alternatively, a regulator of comparable size can be made more accurate.

It will be clear to one skilled in the art that the present invention provides a combined regulator and closing valve without the need for a separate valve, while avoiding low pressure leakage when closed. Further, the invention provides safe, slow opening from a closed position which reduces adiabatic heating effects, which reduces the risk of ignition.

It also provides the option to implement a variable-output regulator that incorporates a valve seat that is sealed on the low-pressure side.

The invention claimed is:

1. A pressure reducing valve comprising:
 a valve house;
  a supporting element that is slidable within the valve housing and relative to a sealing element, the sealing element incorporating a sealing part for sealing a valve seat;
  a regulator biasing member; and
  an actuating mechanism that is operable to apply an actuating force to the supporting element to move it towards the valve seat, the actuating force being adjustable through a threshold value, the valve being configured such that:
   the supporting element is pressed by secondary pressure towards the valve seat and by the regulator biasing member away from the valve seat;
   the sealing element is biased by a closing biasing member towards the valve seat, the closing biasing member being fixed to the supporting element, and the supporting element includes a stop to arrest movement of the sealing element towards the valve seat wherein:
   the closing biasing member and threshold value of the actuating force are configured such that:
   a load applied to the supporting element by the closing biasing member is
   sufficient to ensure that the sealing element rests on the stop if the actuating force is less than the threshold value, thereby ensuring that the sealing and supporting elements are moveable as a single unit under the influence of the regulator biasing member, secondary pressure and any sub-threshold actuating force; and
   on application of an actuating force equal to the threshold value, the sealing element is moved relative to the supporting element such that it no longer rests on the stop, thereby ensuring that the sealing part is pressed onto the valve seat predominantly under the influence of the closing biasing member.

2. The pressure reducing valve according to claim 1 wherein the actuating mechanism includes a load adjustment member configured to apply an adjustable load to the supporting element in a direction to counter the influence of the regulator biasing member, the adjustable load being within a range of 0 and a value above the threshold level, the range including a value at which the adjustable load balances a force supplied by the regulator biasing member.

3. The pressure reducing valve according to claim 2 wherein the load adjustment member is a spring.

4. The pressure reducing valve according to claim 3 wherein the spring is located within a housing of the actuating mechanism, the actuating mechanism housing being moveable to adjust compression of the spring.

5. The pressure reducing valve according to claim 4 wherein the spring is arranged within the housing such that compression continues until such point as the housing meets an upper surface of the valve supporting element.

6. The pressure reducing valve according to claim 1 wherein the threshold value of the actuating force is set to be slightly above the value at which forces acting on the supporting element are balanced.

7. The pressure reducing valve according to claim 1 wherein the supporting element is an outer sliding casing and the sealing element is slidable within the casing.

8. The pressure reducing valve according to claim 7 wherein the closing biasing member is a spring, the outer sliding casing includes a retainer in which is located an upper part of the closing spring and the stop is a face within the outer sliding casing against which a head of the inner sealing element is pushed by the closing spring.

9. The pressure reducing valve according to claim 8 wherein the retainer is level with a surface of the outer sliding casing over which the secondary pressure acts.

10. The pressure reducing valve according to claim 7 wherein the inner sealing element includes one or more cuts in its outside diameter to provide a gas passage between the valve seat and a chamber above the supporting and sealing elements.

11. The pressure reducing valve according to claim 1 wherein the valve housing includes an end stop to limit downward travel of the supporting member.

12. The pressure reducing valve according to claim 1 wherein;
the valve seat is a primary seat;
the valve includes a secondary seat located to a low pressure side of the primary seat; and
the sealing element includes a stem comprising first and second conical portions, the first conical portion being adapted to seal the primary valve seat and the second conical portion, of larger diameter than the first, being configured to seal the secondary seat in the event of the first conical portion becoming incapable of sealing the primary seat.

13. The valve according to claim 1 wherein the supporting and sealing elements are pistons.

14. The valve according claim 1 wherein the supporting element is a diaphragm.

* * * * *